(12) United States Patent
Clark et al.

(10) Patent No.: US 12,361,941 B1
(45) Date of Patent: Jul. 15, 2025

(54) DEVICE STATE REVERSION

(71) Applicant: Amazon Technologies, Inc., Seattle, WA (US)

(72) Inventors: Dustin D Clark, Austin, TX (US); Maisie Wang, Seattle, WA (US); Sven Eberhardt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 422 days.

(21) Appl. No.: 17/708,937

(22) Filed: Mar. 30, 2022

(51) Int. Cl.
*G10L 15/22* (2006.01)
*G10L 15/18* (2013.01)
*G10L 15/30* (2013.01)

(52) U.S. Cl.
CPC .......... *G10L 15/22* (2013.01); *G10L 15/1815* (2013.01); *G10L 15/30* (2013.01); *G10L 2015/223* (2013.01); *G10L 2015/228* (2013.01)

(58) Field of Classification Search
CPC ..... G10L 15/22; G10L 15/1815; G10L 15/30; G10L 2015/223; G10L 2015/228
See application file for complete search history.

(56) References Cited

U.S. PATENT DOCUMENTS

| | | | |
|---|---|---|---|
| 11,038,934 B1* | 6/2021 | Hansen | G10L 15/22 |
| 11,368,420 B1* | 6/2022 | Crook | G06F 16/3322 |
| 2013/0046893 A1* | 2/2013 | Hauser | G06F 9/4856 |
| | | | 709/226 |
| 2019/0222555 A1* | 7/2019 | Skinner | H04L 41/0853 |
| 2022/0236857 A1* | 7/2022 | Sharifi | G06F 3/04842 |

* cited by examiner

*Primary Examiner* — Pierre Louis Desir
*Assistant Examiner* — Keisha Y. Castillo-Torres
(74) *Attorney, Agent, or Firm* — Nicholson De Vos Webster & Elliott LLP

(57) ABSTRACT

Systems and methods for device state reversion are disclosed. For example, a requested and/or scheduled device state change may occur, and prior to the device state change, devices may be queried for their device states. This prior device state data may be saved. A user may provide an undo request and the prior device state data may be utilized along with current device state data to select a device to revert device state on, as well as the device state to revert to. In more complex situations and/or when prior state data is unavailable, machine learning techniques may be utilized to select the target device and device state.

20 Claims, 15 Drawing Sheets

DEVICE STATE REVERSION

BACKGROUND

Internet-of-things devices have become more common in homes and other environments. Some of these devices are operated pursuant to certain rules and/or when a user requests device operation. Described herein are improvements in technology and solutions to technical problems that can be used to, among other things, enhance use of smart home devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
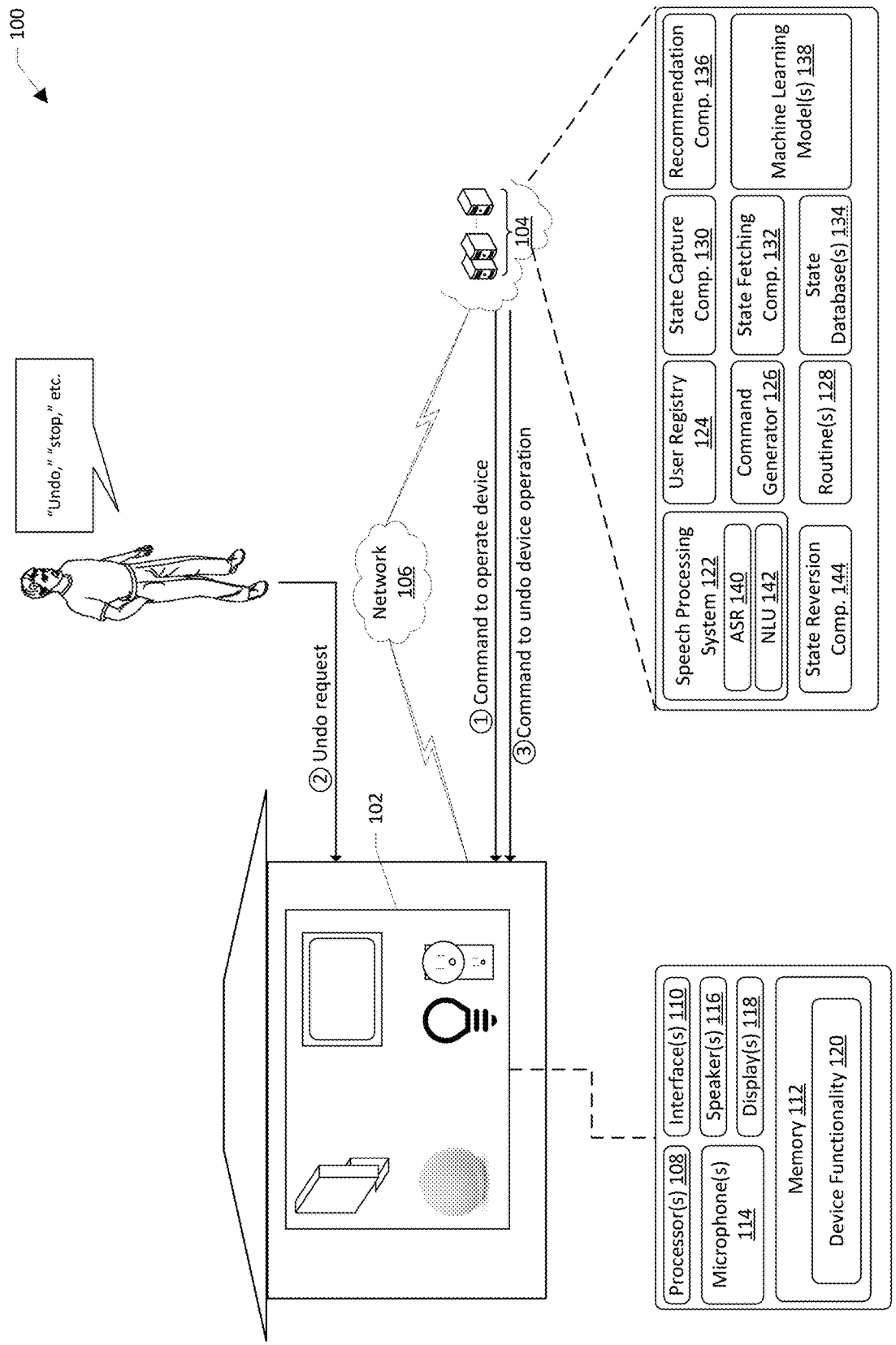
FIG. 1 illustrates a schematic diagram of an example environment for device state reversion.

Systems and methods for device state reversion are disclosed. Take, for example, an environment (such as a home, hotel, vehicle, office, store, restaurant, or other space) where one or more users may be present. The environments may include one or more electronic devices that may be utilized by the users or may otherwise be utilized to detect conditions associated with the environments. For example, the electronic devices may include voice interface devices (e.g., smart speaker devices, mobile phones, tablets, personal computers, televisions, appliances like refrigerators and microwaves, etc.), graphical interface devices (e.g., televisions, set top boxes, virtual/augmented reality headsets, etc.), wearable devices (e.g., smart watch, earbuds, healthcare devices), transportation devices (e.g., cars, bicycles, scooters, etc.), televisions and/or monitors, smart thermostats, security systems (including motion sensors and open/close sensors, including sensors that indicate whether a security system is armed, disarmed, or in a "hoe mode), smart cameras (e.g., home security cameras), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example. As used herein, a "target device" may include an electronic device that is configured to at least receive a signal from one or more devices to cause the target device to perform one or more functionalities. By way of example, a target device may be a "smart" light and/or plug that is configured to receive a command to cause the light to turn on, turn off, dim, brighten, change color, flicker, blink, etc.

In these and other scenarios, one or more actions may be performed by one or more devices based at least in part on a scheduled event occurring and/or based at least in part on a user request to perform the actions. For example, a scheduled action may be performed to change a device state of a device, such as from an on state to an off state. In other examples, a user may provide user input requesting to change a device state of a device. The device states described herein may be any device states. Example device states include an on state, an off state, a temperature setting, a brightness setting, a lock state, an unlock state, an audio on state, an audio off state, a display on state, a display off state, a presence detecting state, a privacy state, a sleeping state, etc. Additionally, while in some examples the actions described herein may be performed with respect to a single device, such as causing a single light to transition from an on state to an off state, it should be understood that the actions may be performed on multiple devices. For example, upon the occurrence of a given event, such as a scheduled time, detection of a condition, receipt of a user request, and/or in response to other state-changing trigger occurring, a light device may change color, another light device may transition to an off state, an audio-output device may start playing music, a television device may start displaying certain images, etc.

In examples, the actions may be performed based at least in part on a determination that such actions are likely desired by a user. For example, a given user may habitually request that a certain light be turned off at or around the same time each day. The systems described herein may utilize data indicating these prior user requests to schedule an automatic action to turn off the light at the given time. Generally, these automatic actions are performed when a confidence value associated with the action performance is sufficient to indicate that the user is likely to want the action to be performed. This functionality is sometimes called an "Alexa hunch"

with respect to Amazon's Alexa and Smart Home systems. However, in some examples, the user in fact does not desire the action to be performed, only desires to have the action be performed sometimes but not always, or desires the action to be performed in a different manner than currently being performed. Furthermore, even in examples where an automatic action is not performed but instead the user specifically requests an action to be performed, the system may misinterpret the user's request and cause an undesired action to be performed, such as turning on an incorrect light. In these and other examples, instead of providing user input to specifically revert the state of the device at issue, such as a user saying "turn the bedroom light back on," a user may merely say "undo," "stop," or otherwise provide an indication that a device state should be reverted but without specifically stating what device to take action and/or what device state to set.

In these and other examples, the systems described herein may be configured to receive an "undo" request, determine what device(s) the undo request is to be associated with, and send commands that cause the device(s) to revert to a previous state. For example, a user may provide a user utterance requesting that a device transition from a first device state to a second device state, such as a light turning from on to off. Alternatively, one or more routines may indicate that the device is scheduled to transition from the first device state to the second device state. As described herein, "routines" may correspond to data that indicates an action is to be performed by a device upon detection of one or more conditions. For example, a first routine may be to have a living room light to turn on at 5:00 pm each weekday, a second routine may be to have a light turn on when presence is detected in an environment and/or to have the light turn off when presence ceases being detected, a third routine may be to cause a television to turn on and/or to change to a given channel based on presence detection, the state of other devices in the environment, at a given time of day, etc. In still other examples, the routines may be more complex and may include multiple devices. For example, a given routine may initiate when a user requests a "party mode" or otherwise provides input indicating the routine should initiate, and the routine may include causing multiple lights to dim, change color, flicker and/or strobe, audio-output devices may output audio, a thermostat may adjust a temperature of an environment, etc.

Whether using a routine-based trigger, specific user input, system-generated "hunch," or other type of trigger, a command generator may be configured to receive data indicating that at least one the device state change is to occur, may store data representing the current state(s) of the device(s) before the state change, and may generate a command to cause the device(s) in question to transition to new device state(s). This command may be sent to the device(s) being targeted, which may cause the device(s) to perform the action indicated by the command, such as transitioning from the first device state to the second device state. For example, if the command is associated with transitioning a device state of a first device and a second device, a state capture component may be configured to determine that a state of the first device and a state of the second device prior to the state change is to be determined. By way of example, the command may be to cause the first device to turn on and to cause the second device to turn off. Based at least in part on the devices being associated with the command, the state capture component may query the first device and the second device for a state of those devices prior to the command being sent to cause the device state transition. In this example, the first device may return data indicating that its state prior to the command being received is an off state, and the second device may return data indicating that its state prior to the command being received is an on state. This prior state data may represent a "snapshot" of device states prior to state change commands being sent, and this prior state data may be stored in a state database. Once the prior state data is acquired, a component of the system may send the command to the device(s) at issue, which may cause the device(s) to perform the device state transition directed by the command.

Thereafter, user input data may be received requesting to undo or otherwise revert device state of a given device. As indicated above, sometimes this user input data explicitly indicates the device to revert state on. By way of example, the user may state "turn bedroom light back on." In this example, the user input data explicitly indicates the target device to revert state on, herein "bedroom light," and also explicitly indicates the requested state, here an "on" state. However, in other examples, the user input data may simply be "undo," "stop," "I don't want that," etc. In these examples, while the intent to undo an action that has been performed is explicit, the target device to revert state on and the state to revert to are not explicit. As such, to determine the target device to revert state on and/or the specific state to revert to, a state reversion component may be configured to first receive the user input data. In some examples, the user input data corresponds to speech input where the user says "undo" or an equivalent. In these examples, a speech processing system may be configured to receive audio data representing the speech input and may determine that the speech input includes an undo intent and may query the state reversion component to perform operations based at least in part on identifying the undo intent. In other examples, the user input data may be provided through a graphical user interface (GUI) or other non-speech methodologies and the system may utilize that user input data to query the state reversion component. In still other examples, user input data that does not necessarily indicate an undo command may be determined to be an undo request that is acted on by the system. For example, a user may provide input such as typing a natural language command to "undo" into a search bar associated with an internet browsing application. That application may interface with the system described herein to determine that the user desires to undo a device state change but has not provided user input to directly do so. This user input data may be utilized to initiate the device state reversion described herein. Still further, user input may not be received to initiate device state reversion, but the system described herein may determine that device state reversion should occur. For example, certain device state changes may be performed when a given condition is satisfied, such as the detection of presence in a given environment. The system may detect user presence and cause the device state change to occur. However, thereafter, the system may determine that the user presence was incorrectly detected or otherwise may determine that user presence was not detected, and based on this determination, the system may initiate the device state reversion techniques described herein.

The state reversion component may be configured to query the state database described herein to determine whether prior state data has been stored in the state database and can be utilized to determine the target device and/or target device state. To do so, timing indicators of the prior device states, prior events, and the undo request may be utilized to determine which of several prior device states likely correspond to given events and given undo requests. For example, if the action that was performed is transitioning a first device from a first device state to a second device state, the prior state data may indicate that the first device was in the first device state at a first time, the event data may indicate that the first device was transitioned to the second device state at a second time that is after but close in time to the first time, and the undo request was received at a third time that is after but close in time to the second time. The state database may return data indicating prior state data as stored in the state database, and the state reversion component may utilize the timing indicators to determine whether the prior state data likely corresponds to the undo request.

In addition to receiving the prior state data from the state database, the state reversion component may query a state fetching component that is configured to acquire a current state of devices associated with given account data. For example, a given environment may be associated with multiple devices that may change state. The state fetching component may be configured to determine the devices that are associated with the account at issue and may query those devices for a current state of the devices. The current device states may be received at the state reversion component, which may utilize the current device state data and the prior state data to determine which of the devices is likely to be the target device to revert device state on. By way of example, the prior state data may indicate that of the multiple devices associated with the account data in question, one device recently underwent a device state change from a first device state to a second device state, and the current device state data may indicate that the device is currently still in the second device state. Utilizing this data, the state reversion component may determine that the target device for the undo request is the first device, and that the undo request indicates that the first device should be transitioned back to the first device state. The state reversion component may send data indicating the target device and/or the requested device state to the command generator, which may generate and send a command to the first device to transition back to the first device state.

In other examples, determining the target device to send a revert state command and/or determining the requested device state to revert to may be more complicated. For example, prior state data may not be available and/or more than one device may have recently transitioned states due to multiple triggers, some of which were correctly executed. For example, two routines may be triggered in response to the same event, such as lights music turned on in the living room and an alarm system being disarmed from a "home and armed" state when a user arrives home while another user is asleep upstairs. But if someone is sleeping in the bedroom next to the living room when someone else gets home, only the music being turned on may need to be undone. In these and other examples, modeling techniques, including the use of machine learning models, may be utilized to determine the target device(s) to revert state on and/or to determine the requested state to be reverted to. For example, the state reversion component may query one or more models for an indication of which device to select as the target device. The models may be trained to utilize various types of data to determine which device associated with account data is likely the target device for the undo command. The model(s) may utilize one or more data input types to determine the target device. Those data input types may include, for example, data from an activity database, data from a presence component, and/or data from one or more additional databases. The activity database may include historical device state information, including when devices have transitioned states previously. The activity database may also include timing data indicating when the devices transitioned states. The activity database may also include device affinity data indicating which devices are typically used to control other devices in an environment. For example, a given voice interface device may typically be used to control a first connected device while a different voice interface device may typically be used to control a second connected device. In addition to the above, the presence component may be configured to determine environments where user presence is and/or is not currently detected. The presence component may also be configured to detect certain conditions of an environment, such as brightness levels, activity states of an environment as a whole, etc. Additionally, the additional databases may include feedback data indicating user reactions to prior device state changes, as well as other potential inputs to the model(s), including inputs that are determined to be relevant by one or more machine learning models over time.

The model(s) may query the various databases and components to receive some or all of the input types described above, and the model(s) may query the devices associated with given account data for current device states of those devices. Utilizing some or all of this information, the model(s) may determine which of the devices associated with the account data is to be selected as the target device. By way of example, the model(s) may determine that while multiple devices recently change device states, a given device is located in a room where user presence is detected and thus that device may be selected as the target device. In other examples, the model(s) may determine that while user presence is detected in a first room with a first device, the undo request was received from a voice interface device located in a second room with a second device and may select the second device as the target device. Additional examples of how the models may utilize the data described herein to select a target device are provided below.

Additionally, when a device is selected as the target device as described herein, the selection may be associated with a given confidence value. When that confidence value satisfies a given confidence value threshold, the device may be selected as the target device and the command to cause the selected device to revert device state may be sent. However, in some examples, the confidence value may not satisfy the given confidence value threshold, but may satisfy a different confidence value threshold indicating additional input would be helpful in selecting the target device. In these examples, user input may be requested to confirm that the target device is the selected device from the multiple potential devices associated with given account data. In still other examples, the confidence value may not satisfy even the second confidence value threshold, and in these examples the system may determine that a device should not be selected and may refrain from causing one or more devices to revert state in response to the undo request.

Additionally, in certain examples, multiple undo commands may be received. The system may be configured to determine when at least a portion of the multiple undo commands are related or otherwise request device reversion in response to the same or a similar action being performed multiple times. In these examples, a recommendation component may be configured to receive an indication of the multiple related undo commands and may generate a recommendation to change a routine, change subsequent user input, etc. The recommendation may indicate the recommended change and may provide functionality for accepting or rejecting the recommendation. If accepted, the system may generate data representing a new routine with the applicable change made thereto. By so doing, the system may mitigate future undo requests by changing the conditions to be detected prior to performing scheduled actions.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for device state reversion. The system 100 may include, for example, one or more devices 102. In certain examples, the devices 102 may be a voice-enabled device (e.g., smart speaker devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In examples, the devices 102 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, hotel, etc.), for example. The devices 102 may be configured to send data to and/or receive data from a system 104, such as via a network 106. It should be understood that where operations are described herein as being performed by the system 104, some or all of those operations may be performed by the devices 102. It should also be understood that anytime the system 104 is referenced, that system may include any system and/or device, whether local to an environment of the devices 102 or remote from that environment. Additionally, it should be understood that a given space and/or environment may include numerous devices 102. It should also be understood that when a "space" or "environment" is used herein, those terms mean an area and not necessarily a given room, building, or other structure, unless otherwise specifically described as such.

The devices 102 may include one or more components, such as, for example, one or more processors 108, one or more network interfaces 110, memory 112, one or more microphones 114, one or more speakers 116, and/or one or more displays 118. The microphones 114 may be configured to capture audio, such as user utterances, and generate corresponding audio data. The speakers 116 may be configured to output audio, such as audio corresponding to audio data received from another device. The displays 118 may be configured to display images corresponding to image data, such as image data received from the system 104. The devices 102 may also include sensors configured to detect an environmental condition associated with the devices 102 and/or the environment associated with the devices 102. Some example sensors may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors, usage data and/or account data may be utilized to determine if an environmental condition is present. Additionally, the memory 112 may include components such as device functionality 120. The device functionality 120 may include functionality specific to a device 102, such as functionality for turning a light on and off, changing light color and/or brightness, controlling a locking mechanism, adjusting temperature settings, and/or any other functionality associated with a smart device.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 106 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 104 may include components such as, for example, a speech processing system 122, a user registry 124, a command generator 126, one or more routines 128, a state capture component 130, a state fetching component 132, one or more state databases 134, a recommendation component 136, one or more machine learning models 138, and/or a state reversion component 144. It should be understood that while the components of the system 104 are depicted and/or described as separate from each other in FIG. 1, some or all of the components may be a part of the same system. The speech processing system 122 may include an automatic speech recognition component (ASR) 140 and/or a natural language understanding component (NLU) 142. Each of the components described herein with respect to the system 104 may be associated with their own systems, which collectively may be referred to herein as the system 104, and/or some or all of the components may be associated with a single system. Additionally, the system 104 may include one or more applications, which may be described as skills. "Skills," as described herein may be applications and/or may be a subset of an application. For example, a skill may receive data representing an intent. For example, an intent may be determined by the NLU component 142 and/or as determined from user input via a computing device. Skills may be configured to utilize the intent to output data for input to a text-to-speech component, a link or other resource locator for audio data, and/or a command to a device, such as the devices 102. "Skills" may include applications running on devices, such as the devices 102, and/or may include portions that interface with voice user interfaces of devices 102.

In instances where a voice-enabled device is utilized, skills may extend the functionality of devices 102 that can be controlled by users utilizing a voice-user interface. In some examples, skills may be a type of application that may be useable in association with target devices 102 and may have been developed specifically to work in connection with given target devices 102. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s), which may be the state reversion component 144, may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

Additionally, the operations and/or functionalities associated with and/or described with respect to the components of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 104, the user registry 124 may be configured to determine and/or generate associations between users, user accounts, environment identifiers, and/or devices. For example, one or more associations between user accounts may be identified, determined, and/or generated by the user registry 124. The user registry 124 may additionally store information indicating one or more applications and/or resources accessible to and/or enabled for a given user account. Additionally, the user registry 124 may include information indicating device identifiers, such as naming identifiers, associated with a given user account, as well as device types associated with the device identifiers. The user registry 124 may also include information indicating user account identifiers, naming indicators of devices associated with user accounts, and/or associations between devices, such as the devices 102. The user registry 124 may also include information associated with usage of the devices 102. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 122 may be configured to receive audio data from the devices 102 and/or other devices and perform speech-processing operations. For example, the ASR component 140 may be configured to generate text data corresponding to the audio data, and the NLU component 142 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "undo," the NLU component 142 may identify an "undo" intent. In this example where the intent data indicates an intent to revert a device state to a previous state, the speech processing system 122 may call one or more speechlets and/or applications to effectuate the intent, such as the state reversion component 144. Speechlets, as described herein may otherwise be described as applications and may include functionality for utilizing intent data to generate directives and/or instructions. The state reversion component 144 may be designated as being configured to handle the intent of determine a target device to revert device state on, for example. The state reversion component 144 may receive the intent data and/or other data associated with the user utterance from the NLU component 142, such as by an orchestrator of the system 104, and may perform operations to revert a device state to a previous state, for example. The system 104 may generate audio data confirming that the state reversion has occurred placed, such as by a text-to-speech component. The audio data may be sent from the system 104 to one or more of the devices 102.

The components of the system 100 are described below by way of example. For example, the systems described herein may be configured to receive an "undo" command, determine what device(s) the undo command is to be associated with, and send commands that cause the device(s) 102 to revert to a previous state. For example, a user may provide a user utterance requesting that a device 102 transition from a first device state to a second device state, such as a light turning from on to off. Alternatively, one or more routines 128 may indicate that the device 102 is scheduled to transition from the first device state to the second device state. As described herein, "routines" may correspond to data that indicates an action is to be performed by a device 102 upon detection of one or more conditions. For example, a first routine 128 may be to have a living room light to turn on at 5:00 pm each weekday, a second routine 128 may be to have a light turn on when presence is detected in an environment and/or to have the light turn off when presence ceases being detected, a third routine 128 may be to cause a television to turn on and/or to change to a given channel based on presence detection, the state of other devices 102 in the environment, at a given time of day, etc. In still other examples, the routines 128 may be more complex and may include multiple devices 102. For example, a given routine 128 may initiate when a user requests a "party mode" or otherwise provides input indicating the routine 128 should initiate, and the routine 128 may include causing multiple lights to dim, change color, flicker and/or strobe, audio-output devices may output audio, a thermostat may adjust a temperature of an environment, etc.

Whether using a routine 128, specific user input, or otherwise, the command generator 126 may be configured to receive data indicating that the device state change is to occur and may generate a command to cause the device(s) 102 in question to transition device states. This command may be sent to the device(s) 102 at issue, which may cause the device(s) 102 to perform the action indicated by the command, such as transitioning from the first device state to the second device state. However, prior to the command being sent, the state capture component 130 may be configured to determine a state of the device(s) 102 associated with the command. For example, if the command is associated with transitioning a device state of a first device and a second device, the state capture component 130 may be configured to determine that a state of the first device and a state of the second device prior to the state change is to be determined. By way of example, the command may be to cause the first device to turn on and to cause the second device to turn off. Based at least in part on the devices associated with the command, the state capture component 130 may query the first device and the second device for a state of those devices prior to the command being sent to cause the device state transition. In this example, the first device may return data indicating that its state prior to the command being received is an off state, and the second device may return data indicating that its state prior to the command being received is an on state. This prior state data may represent a "snapshot" of device states prior to state change commands being sent, and this prior state data may be stored in the state database 134. Once the prior state data is acquired, a component of the system 104 may send the command to the device(s) 102 at issue, which may cause the device(s) 102 to perform the device state transition directed by the command.

Thereafter, user input data may be received requesting to undo or otherwise revert device state of a given device 102. As indicated above, sometimes this user input data explicitly indicates the device 102 to revert state on. By way of example, the user may state "turn bedroom light back on." In this example, the user input data explicitly indicates the target device to revert state on, herein "bedroom light," and also explicitly indicates the requested state, here an "on" state. However, in other examples, the user input data may simply be "undo," "stop," "I don't want that," etc. In these examples where the intent to undo an action that has been performed is not explicit, the target device to revert state on and the state to revert to are not explicit. As such, to determine the target device to revert state on and/or the specific state to revert to, the state reversion component 144 may be configured to first receive the user input data. In some examples, the user input data corresponds to speech input where the user says "undo" or an equivalent. In these examples, the speech processing system 122 may be configured to receive audio data representing the speech input and may determine that the speech input includes an undo intent and may query the state reversion component 144 to perform operations based at least in part on identifying the undo intent. In other examples, the user input data may be provided through a GUI or other non-speech methodologies and the system 104 may utilize that user input data to query the state reversion component 144. In still other examples, user input data that does not necessarily indicate an undo command may be determined to be an undo request that is acted on by the system. For example, a user may provide input such as typing a natural language command to "undo" into a search bar associated with an internet browsing application. That application may interface with the system described herein to determine that the user desires to undo a device state change but has not provided user input to directly do so. This user input data may be utilized to initiate the device state reversion described herein. Still further, user input may not be received to initiate device state reversion, but the system described herein may determine that device state reversion should occur. For example, certain device state changes may be performed when a given condition is satisfied, such as the detection of presence in a given environment. The system may detect user presence and cause the device state change to occur. However, thereafter, the system may determine that the user presence was incorrectly detected or otherwise may determine that user presence was not detected, and based on this determination, the system may initiate the device state reversion techniques described herein.

The state reversion component 144 may be configured to query the state database 134 described herein to determine whether prior state data has been stored in the state database 134 and can be utilized to determine the target device and/or target device state. To do so, timing indicators of the prior device states, prior events, and the undo request may be utilized to determine which of several prior device states likely corresponds to given events and given undo requests. For example, if the action that was performed is transitioning a first device from a first device state to a second device state, the prior state data may indicate that the first device was in the first device state at a first time, the event data may indicate that the first device was transitioned to the second device state at a second time that is after but close in time to the first time, and the undo request was received at a third time that is after but close in time to the second time. The state database 134 may return data indicating prior state data as stored in the state database 134, and the state reversion component 144 may utilize the timing indicators to determine whether the prior state data likely corresponds to the undo request. It should be understood that the state reversion component 144 may be a component of the system 104 and/or the state reversion component 144 may be a component of one or more of the devices 102, a hub device, an edge server, a wearable device, and/or any other device associated with the environment where one or more of the devices 102 are disposed.

In addition to receiving the prior state data from the state database 134, the state reversion component 144 may query the state fetching component 132 that is configured to fetch a current state of devices 102 associated with given account data. For example, a given environment may be associated with multiple devices 102 that may change state. The state fetching component 132 may be configured to determine the devices 102 that are associated with the account at issue and may query those devices 102 for a current state of the devices 102. The current device states may be received at the state reversion component 144, which may utilize the current device state data and the prior state data to determine which of the devices 102 is likely to be the target device to revert device state on. By way of example, the prior state data may indicate that of the multiple devices 102 associated with the account data in question, one device recently underwent a device state change from a first device state to a second device state, and the current device state data may indicate that the device is currently still in the second device state. Utilizing this data, the state reversion component 144 may determine that the target device for the undo request is the first device, and that the undo request indicates that the first device should be transitioned back to the first device state. The state reversion component 144 may send data indicating the target device and/or the requested device state to the command generator 126, which may generate and send a command to the first device to transition back to the first device state.

In other examples, determining the target device to revert state on and/or determining the requested device state may be more complicated. For example, prior state data may not be available and/or more than one device 102 may have recently transitioned states. In these and other examples, modeling techniques, including the use of machine learning models 138, may be utilized to determine the target device to revert state on and/or to determine the requested state to be reverted to. For example, the state reversion component 144 may query one or more models 138 for an indication of which device 102 to select as the target device. The models 138 may be trained to utilize various types of data to determine which device 102 associated with account data is likely the target device for the undo command. The model(s) 138 may utilize one or more data input types to determine the target device. Those data input types may include, for example, data from an activity database, data from a presence component, and/or data from one or more additional devices. The activity database may include historical device state information, including when devices 102 have transitioned states previously. The activity database may also include timing data indicating when the devices 102 transitioned states. The activity database may also include device affinity data indicating which devices 102 are typically used to control other devices in an environment. For example, a given voice interface device may typically be used to control a first connected device while a different voice interface device may typically be used to control a second connected device. In addition to the above, the presence component may be configured to determine environments where user presence is and/or is not currently detected. The presence component may also be configured to detect certain conditions of an environment, such as brightness levels, activity states of an environment as a whole, etc. Additionally, the additional databases may include feedback data indicating user reactions to prior device state changes, as well as other potential inputs to the model(s), including inputs that are determined to be relevant by one or more machine learning models 138.

The model(s) 138 may query the various databases and components to receive some or all of the input types described above, and the model(s) 138 may query the devices 102 associated with given account data for current device states of those devices 102. Utilizing some or all of this information, the model(s) 138 may determine which of the devices 102 associated with the account data is to be selected as the target device. By way of example, the model(s) 138 may determine that while multiple devices 102 recently changed device states, a given device 102 is located in a room where user presence is detected and thus that device 102 may be selected as the target device. In other examples, the model(s) 138 may determine that while user presence is detected in a first room with a first device, the undo request was received from a voice interface device located in a second room with a second device and may select the second device as the target device. Additional examples of how the model(s) 138 may utilize the data described herein to select a target device are provided below.

Additionally, when a device 102 is selected as the target device as described herein, the selection may be associated with a given confidence value. When that confidence value satisfies a given confidence value threshold, the device 102 may be selected as the target device and the command to cause the selected device to revert device state may be sent. However, in some examples, the confidence value may not satisfy the given confidence value threshold, but may satisfy a different confidence value threshold indicated additional input would be helpful in selecting the target device. In these examples, user input may be requested to confirm that the target device is the selected device from the multiple potential devices associated with given account data. In still other examples, the confidence value may not satisfy even the second confidence value threshold, and in these examples the system 104 may determine that a device should not be selected and may refrain from causing one or more devices 102 to revert state in response to the undo request.

Additionally, in certain examples, multiple undo commands may be received. The system 104 may be configured to determine when at least a portion of the multiple undo commands are related or otherwise request device reversion in response to the same or a similar action being performed multiple times. In these examples, the recommendation component 136 may be configured to receive an indication of the multiple related undo commands and may generate a recommendation to change a routine, change subsequent user input, etc. The recommendation may indicate the recommended change and may provide functionality for accepting or rejecting the recommendation. If accepted, the system 104 may generate data representing a new routine with the applicable change made thereto. By so doing, the system 104 may mitigate future undo requests by changing the conditions to be detected prior to performing scheduled actions.

As used herein, the one or more models 138 and/or the components responsible for detecting user presence may be machine learning models. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with the prior undo requests and related actions. The models may be trained for multiple user accounts and/or for a specific user account. As such, the machine learning models may be configured to learn, without human intervention, attributes of collected data and/or actions taken associated with undo requests that are more likely and/or less likely to be associated with selection of a given device as a target device of an undo request.

It should be noted that while text data is described as a type of data utilized to communicate between various components of the system 104 and/or other systems and/or devices, the components of the system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102.

As shown in FIG. 1, several of the components of the system 104 and the associated functionality of those components as described herein may be performed by one or more of the devices 102. Additionally, or alternatively, some or all of the components and/or functionalities associated with the devices 102 may be performed by the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 104 may possess its own local memory, which also may store program components, program data, and/or one or more operating systems.

The memory 112 and/or the memory described with respect to the components of the system 104 may include volatile and nonvolatile memory, removable and non-removable media implemented in any method or technology for storage of information, such as computer-readable instructions, data structures, program component, or other data. Such memory 112 and/or the memory described with respect to the components of the system 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the system 104 may be implemented as computer-readable storage media ("CRSM"), which may be any available physical media accessible by the processor(s) 108 and/or the processor(s) described with respect to the system 104 to execute instructions stored on the memory 112 and/or the memory described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or the network interface(s) described with respect to the components of the system 104 may enable messages between the components and/or devices shown in system 100 and/or with one or more other polling systems, as well as other networked devices. Such network interface(s) 110 and/or the network interface(s) described with respect to the components of the system 104 may include one or more network interface controllers (NICs) or other types of transceiver devices to send and receive messages over the network 106.

For instance, each of the network interface(s) 110 and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the system 104 may include a wide area network (WAN) component to enable message over a wide area network.

In some instances, the system 104 may be local to an environment associated the devices 102. For instance, the system 104 may be located within one or more of the devices 102. In some instances, some or all of the functionality of the system 104 may be performed by one or more of the devices 102. Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2A:
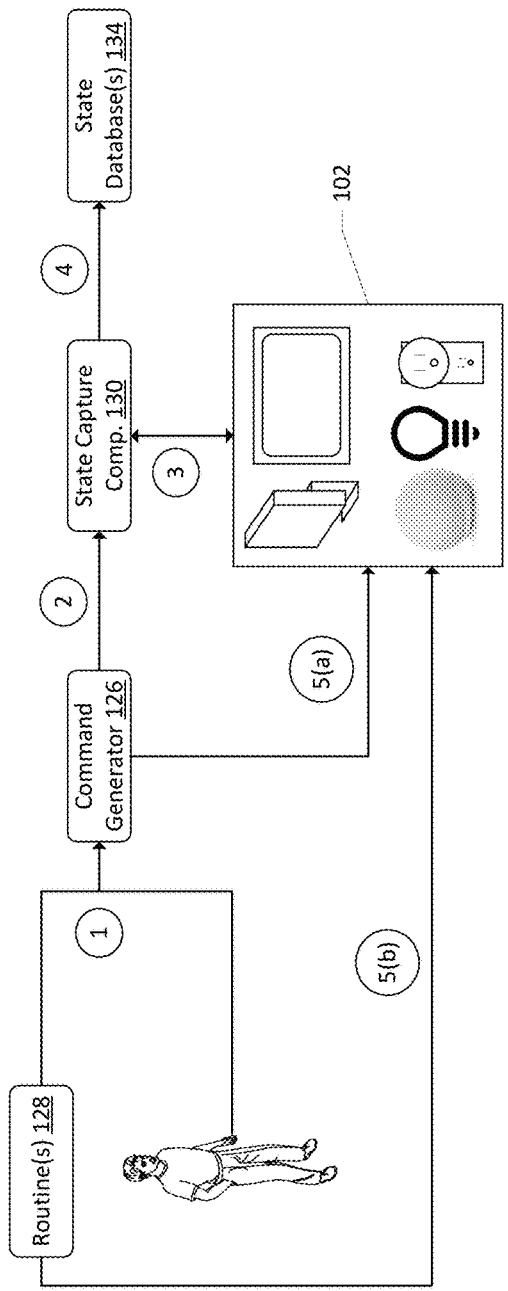
FIG. 2A illustrates a conceptual diagram of example components utilized for device control.

FIG. 2A illustrates a conceptual diagram of example components utilized for device control. FIG. 2A may include the same or similar components as described with respect to FIG. 1. For example, FIG. 2A may include one or more routines 128, a command generator 126, a state capture component 130, one or more state databases 134, and/or one or more devices 102. The components of FIG. 2A may be utilized to transition a device state of one or more devices 102 based on a user request and/or a routine 128. The operations performed in association with FIG. 2A are described with respect to steps 1-5(b). It should be understood however that the operations may include more or less than 5 steps and may be performed in an order different than described as an example in FIG. 2A.

For example, at step 1, a user may provide a user utterance requesting that a device 102 transition from a first device state to a second device state, such as a light turning from on to off. Alternatively, one or more routines 128 may indicate that the device 102 is scheduled to transition from the first device state to the second device state. Whether using a routine 128, specific user input, or otherwise, the command generator 126 may be configured to receive data indicating that the device state change is to occur and may generate a command to cause the device(s) 102 in question to transition device states. This command may be sent to the device(s) 102 at issue, which may cause the device(s) 102 to perform the action indicated by the command, such as transitioning from the first device state to the second device state.

However, prior to the command being sent, at step 2, the command generator 126 may send an indication to the state capture component 130 that the command will be sent. At step 3, the state capture component 130 may be configured to determine a state of the device(s) 102 associated with the command. For example, if the command is associated with transitioning a device state of a first device and a second device, the state capture component 130 may be configured to determine that a state of the first device and a state of the second device prior to the state change is to be determined. By way of example, the command may be to cause the first device to turn on and to cause the second device to turn off. Based at least in part on the devices associated with the command, the state capture component 130 may query the first device and the second device for a state of those devices prior to the command being sent to cause the device state transition. In this example, the first device may return data indicating that its state prior to the command being received is an off state, and the second device may return data indicating that its state prior to the command being received is an on state. At step 4, this prior state data may represent a "snapshot" of device states prior to state change commands being sent, and this prior state data may be stored in the state database 134. Once the prior state data is acquired, at step 5(a), the command generator 126 may send the command to the device(s) 102 at issue, which may cause the device(s) 102 to perform the device state transition directed by the command. Alternatively, at step 5(b), the routine(s) 128 may send the command to the device(s) 102 at issue, which may cause the device(s) 102 to perform the device state transition directed by the command.

Figure 2B:
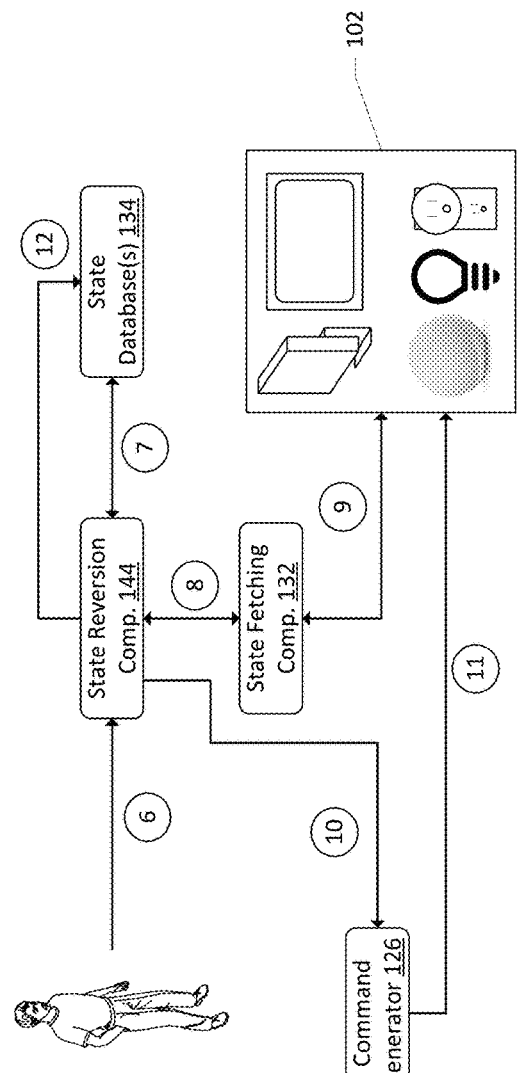
FIG. 2B illustrates a conceptual diagram of example components utilized for device state reversion.

FIG. 2B illustrates a conceptual diagram of example components utilized for device state reversion. FIG. 2B may include the same or similar components as described with respect to FIG. 1. For example, FIG. 2B may include a state reversion component 144, a command generator 126, a state fetching component 132, one or more state databases 134, and/or one or more devices 102. The components of FIG. 2B may be utilized to select a device to revert device state on in response to an undo request. The operations performed in association with FIG. 2B are described with respect to steps 6-12 following steps 1-5 from FIG. 2A. It should be understood however that the operations may include more or less than 7 steps and may be performed in an order different than described as an example in FIG. 2B.

For example, at step 6, user input data may be received requesting to undo or otherwise revert device state of a given device 102. As indicated above, sometimes this user input data explicitly indicates the device 102 to revert state on. By way of example, the user may state "turn bedroom light back on." In this example, the user input data explicitly indicates the target device to revert state on, herein "bedroom light," and also explicitly indicates the requested state, here an "on" state. However, in other examples, the user input data may simply be "undo," "stop," "I don't want that," etc. In these examples while the intent to undo an action that has been performed is explicit, the target device to revert state on and the state to revert to are not explicit. As such, to determine the target device to revert state on and/or the specific state to revert to, the state reversion component 144 may be configured to first receive the user input data. In some examples, the user input data corresponds to speech input where the user says "undo" or an equivalent. In these examples, the speech processing system may be configured to receive audio data representing the speech input and may determine that the speech input includes an undo intent and may query the state reversion component 144 to perform operations based at least in part on identifying the undo intent. In other examples, the user input data may be provided through a GUI or other non-speech methodologies and the system 104 may utilize that user input data to query the state reversion component 144. In still other examples, user input data that does not necessarily indicate an undo command may be determined to be an undo request that is acted on by the system. For example, a user may provide input such as typing a natural language command to "undo" into a search bar associated with an internet browsing application. That application may interface with the system described herein to determine that the user desires to undo a device state change but has not provided user input to directly do so. This user input data may be utilized to initiate the device state reversion described herein. Still further, user input may not be received to initiate device state reversion, but the system described herein may determine that device state reversion should occur. For example, certain device state changes may be performed when a given condition is satisfied, such as the detection of presence in a given environment. The system may detect user presence and cause the device state change to occur. However, thereafter, the system may determine that the user presence was incorrectly detected or otherwise may determine that user presence was not detected, and based on this determination, the system may initiate the device state reversion techniques described herein.

At step 7, the state reversion component 144 may be configured to query the state database 134 described herein to determine whether prior state data has been stored in the state database 134 and can be utilized to determine the target device and/or target device state. To do so, timing indicators of the prior device states, prior events, and the undo request may be utilized to determine which of several prior device states likely corresponds to given events and given undo requests. For example, if the action that was performed is transitioning a first device from a first device state to a second device state, the prior state data may indicate that the first device was in the first device state at a first time, the event data may indicate that the first device was transitioned to the second device state at a second time that is after but close in time to the first time, and the undo request was received at a third time that is after but close in time to the second time. The state database 134 may return data indicating prior state data as stored in the state database 134, and the state reversion component 144 may utilize the timing indicators to determine whether the prior state data likely corresponds to the undo request.

In addition to receiving the prior state data from the state database 134, at step 8, the state reversion component 144 may query the state fetching component 132 that is configured to fetch, at step 9, a current state of devices 102 associated with given account data. For example, a given environment may be associated with multiple devices 102 that may change state. The state fetching component 132 may be configured to determine the devices 102 that are associated with the account at issue and may query those devices 102 for a current state of the devices 102. The current device states may be received at the state reversion component 144, which may utilize the current device state data and the prior state data to determine which of the devices 102 is likely to be the target device to revert device state on. By way of example, the prior state data may indicate that of the multiple devices 102 associated with the account data in question, one device recently underwent a device state change from a first device state to a second device state, and the current device state data may indicate that the device is currently still in the second device state. Utilizing this data, the state reversion component 144 may determine that the target device for the undo request is the first device, and that the undo request indicates that the first device should be transitioned back to the first device state.

At step 10, the state reversion component 144 may send data indicating the target device and/or the requested device state to the command generator 126, which may generate and send, at step 11, a command to the first device to transition back to the first device state.

At step 12, the state version component 144 may generate and send data indicating that the undo request was successfully responded to such that the selected device(s) were reverted to a previous state. This data may be stored in the state database(s) 134 for further device state reversion processing, including when a "redo" command is received and/or for offline recommendation generation.

Figure 3:
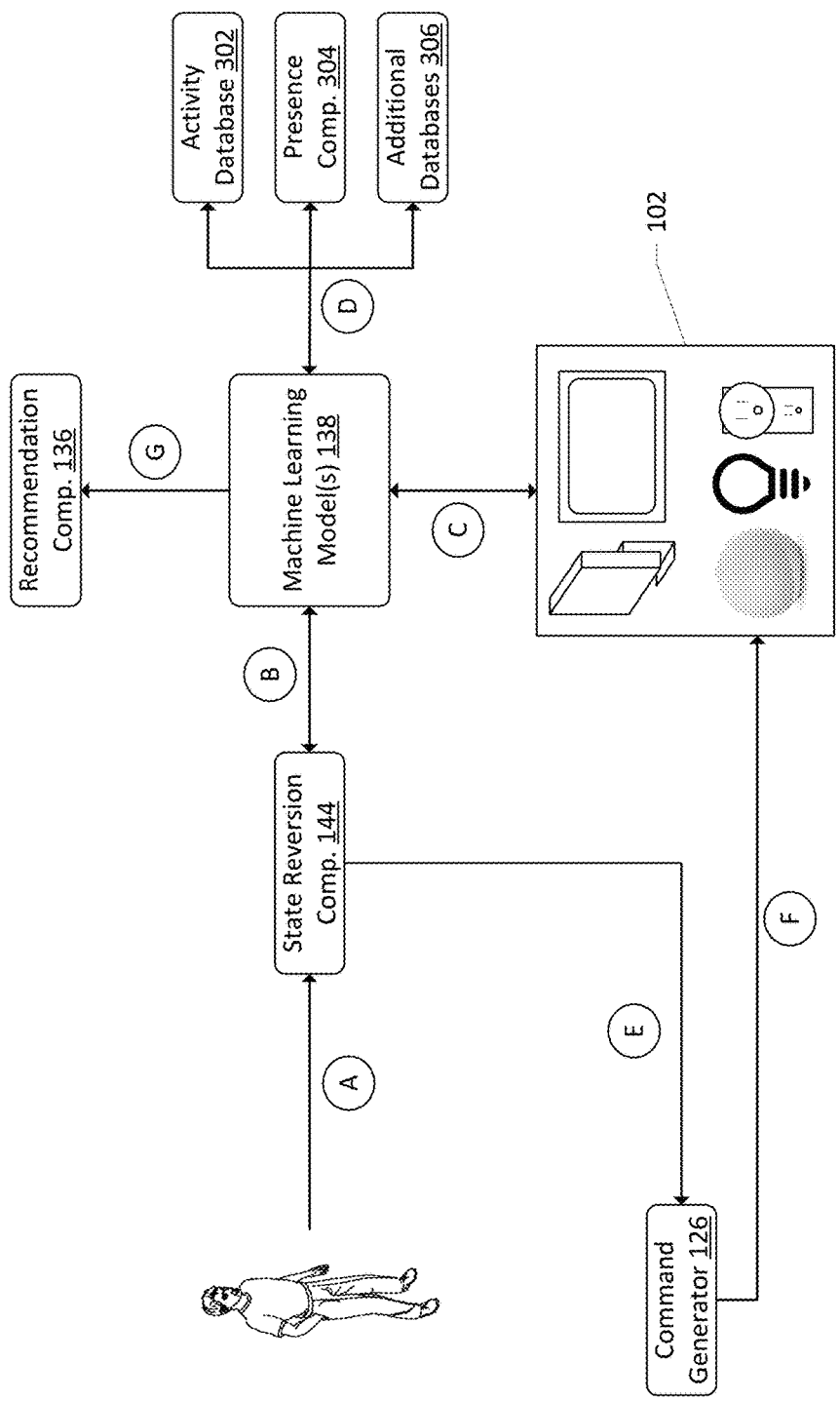
FIG. 3 illustrates a conceptual diagram of example components utilized for device state reversion using machine learning techniques.

FIG. 3 illustrates a conceptual diagram of example components utilized for device state reversion using machine learning techniques. FIG. 3 may include the same or similar components as described with respect to FIG. 1. For example, FIG. 3 may include a state reversion component 144, a command generator 126, one or more machine learning models 138, and/or one or more devices 102. FIG. 3 may also include an activity database 302, a presence component 304, and/or additional databases 306. The components of FIG. 3 may be utilized to select a device to revert device state on in response to an undo request. The operations performed in association with FIG. 3 are described with respect to steps A-G. It should be understood however that the operations may include more or less than 7 steps and may be performed in an order different than described as an example in FIG. 3.

For example, at step A, user input data requesting device state reversion may be received at the state reversion component 144. By way of example, the user may state "turn bedroom light back on." In this example, the user input data explicitly indicates the target device to revert state on, herein "bedroom light," and also explicitly indicates the requested state, here an "on" state. However, in other examples, the user input data may simply be "undo," "stop," "I don't want that," etc. In these examples, while the intent to undo an action that has been performed is explicit, the target device to revert state on and the state to revert to are not explicit. As such, to determine the target device to revert state on and/or the specific state to revert to, the state reversion component 144 may be configured to first receive the user input data. In some examples, the user input data corresponds to speech input where the user says "undo" or an equivalent. In these examples, the speech processing system may be configured to receive audio data representing the speech input and may determine that the speech input includes an undo intent and may query the state reversion component 144 to perform operations based at least in part on identifying the undo intent. In other examples, the user input data may be provided through a GUI or other non-speech methodologies and the system 104 may utilize that user input data to query the state reversion component 144.

In the example where prior state data may not be available and/or more than one device 102 may have recently transitioned states, modeling techniques, including the use of machine learning models 138, may be utilized to determine the target device to revert state on and/or to determine the requested state to be reverted to. For example, the state reversion component 144 may query, at step B, one or more models 138 for an indication of which device 102 to select as the target device. The models 138 may be trained to utilize various types of data to determine which device 102 associated with account data is likely the target device for the undo command. The model(s) 138 may utilize one or more data input types to determine the target device. Those data input types may include, for example, data from the activity database 302, data from the presence component 304, and/or data from one or more additional databases 306.

At step C, the model(s) 138 may query the devices 102 associated with given account data for a current state of the devices. At step D, the model(s) 138 may request indications from the activity database 302, the presence component 304, and/or the additional databases 306. The activity database 302 may include historical device state information, including when devices 102 have transitioned states previously. The activity database 302 may also include timing data indicating when the devices 102 transitioned states. The activity database 302 may also include device affinity data indicating which devices 102 are typically used to control other devices in an environment. For example, a given voice interface device may typically be used to control a first connected device while a different voice interface device may typically be used to control a second connected device. In addition to the above, the presence component 304, described in more detail with respect to FIG. 14, may be configured to determine environments where user presence is and/or is not currently detected. The presence component 304 may also be configured to detect certain conditions of an environment, such as brightness levels, activity states of an environment as a whole, etc. Additionally, the additional databases 306 may include feedback data indicating user reactions to prior device state changes, as well as other potential inputs to the model(s), including inputs that are determined to be relevant by one or more machine learning models 138.

The model(s) 138 may query the various databases and components to receive some or all of the input types described above. Utilizing some or all of this information, the model(s) 138 may determine which of the devices 102 associated with the account data is to be selected as the target device. By way of example, the model(s) 138 may determine that while multiple devices 102 recently changed device states, a given device 102 is located in a room where user presence is detected and thus that device 102 may be selected as the target device. In other examples, the model(s) 138 may determine that while user presence is detected in a first room with a first device, the undo request was received from a voice interface device located in a second room with a second device and may select the second device as the target device. Additional examples of how the model(s) 138 may utilize the data described herein to select a target device are provided below. The model(s) 138 may return the indication of the selected device to the state reversion component 144, and at step E, the state reversion component 144 may send data indicating the selected device and the selected device state to revert the selected device to the command generator 126. At step F, the command generator 126 may send the command to the selected device to cause device state reversion of the selected device.

At step G, having determined the target device for performing device state reversion on, the machine learning model(s) 138 may send data indicating the selected target device and/or other data associated with the given undo request to a recommendation component 136. The recommendation component 136 may utilize this data to determine whether to change how the scheduled and/or requested device state change occurs. For example, the recommendation component 136 may determine that the scheduled device state change should no longer occur, that the scheduled device state change should occur only if additional and/or different conditions are met than those currently used to determine when the device state change occurs, etc. The recommendation component 136 may generate a recommendation to make the changes described above and may await user confirmation of the recommendation before making the changes. In other examples, the recommendation component 136 may cause the changes to be made without user confirmation.

Figure 4:
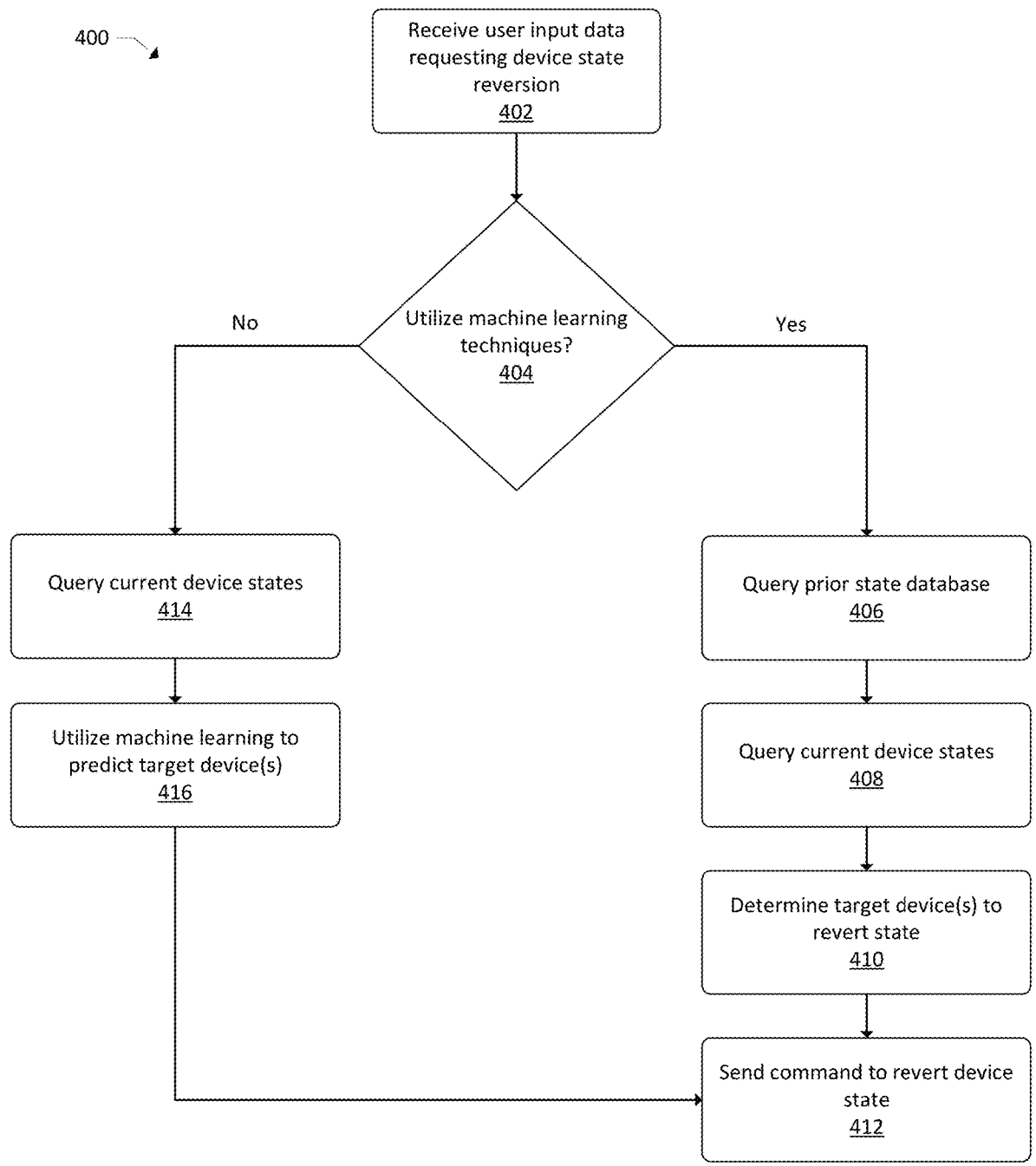
FIG. 4 illustrates a flow diagram of an example process for determining whether to utilize machine learning techniques for device state reversion.

FIG. 4 illustrates processes for device state reversion. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3 and 5-14, although the processes may be implemented in a wide variety of other environments, architectures and systems.

FIG. 4 illustrates a flow diagram of an example process 400 for determining whether to utilize machine learning techniques for device state reversion. The order in which the operations or steps are described is not intended to be construed as a limitation, and any number of the described operations may be combined in any order and/or in parallel to implement process 400.

At block 402, the process 400 may include receiving user input data requesting device state reversion. As indicated above, sometimes this user input data explicitly indicates the device to revert state on. By way of example, the user may state "turn bedroom light back on." In this example, the user input data explicitly indicates the target device to revert state on, herein "bedroom light," and also explicitly indicates the requested state, here an "on" state. However, in other examples, the user input data may simply be "undo," "stop," "I don't want that," etc. In these examples, while the intent to undo an action that has been performed is explicit, the target device to revert state on and the state to revert to are not explicit. As such, to determine the target device to revert state on and/or the specific state to revert to, a state reversion component may be configured to first receive the user input data. In some examples, the user input data corresponds to speech input where the user says "undo" or an equivalent. In these examples, a speech processing system may be configured to receive audio data representing the speech input and may determine that the speech input includes an undo intent and may query the state reversion component to perform operations based at least in part on identifying the undo intent. In other examples, the user input data may be provided through a GUI or other non-speech methodologies and the system may utilize that user input data to query the state reversion component.

At block 404, the process 400 may include determining whether to utilize machine learning techniques for selecting the target device and/or a target device state for reversion. For example, a state reversion component may be configured to query a state database as described herein to determine whether prior state data has been stored in the state database and can be utilized to determine the target device and/or target device state. To do so, timing indicators of the prior device states, prior events, and the undo request may be utilized to determine which of several prior device states likely corresponds to given events and given undo requests. For example, if the action that was performed is transitioning a first device from a first device state to a second device state, the prior state data may indicate that the first device was in the first device state at a first time, the event data may indicate that the first device was transitioned to the second device state at a second time that is after but close in time to the first time, and the undo request was received at a third time that is after but close in time to the second time. The state database may return data indicating prior state data as stored in the state database, if available. In other examples, the machine learning techniques described herein may be utilized when multiple device state snapshots have been captured and a determination of which snapshot to utilize should be made, and/or when multiple environments are associated with a given undo request and/or when timing considerations make determining the target device complex, etc. Additionally, it should be understood that a model, including a machine learning model, may be trained to make the determination of whether machine learning techniques will be utilized for selecting the target device and/or target device reversion state.

In examples where machine learning techniques are not to be used, then the process 400 may include, at block 406, querying a prior state database for the prior device state. The prior device state data may be received from the state database for use in selecting a device to perform device state reversion on.

At block 408, the process 400 may include querying the device(s) for a current device state. For example, in addition to receiving the prior state data from the state database, the state reversion component may query a state fetching component that is configured to fetch a current state of devices associated with given account data. For example, a given environment may be associated with multiple devices that may change state. The state fetching component may be configured to determine the devices that are associated with the account at issue and may query those devices for a current state of the devices. The current device states may be received at the state reversion component, which may utilize the current device state data and the prior state data to determine which of the devices is likely to be the target device to revert device state on.

At block 410, the process 400 may include determining one or more target devices to revert device state on. For example, the prior state data may indicate that of the multiple devices associated with the account data in question, one device recently underwent a device state change from a first device state to a second device state, and the current device state data may indicate that the device is currently still in the second device state. Utilizing this data, the state reversion component may determine that the target device for the undo request is the first device, and that the undo request indicates that the first device should be transitioned back to the first device state.

At block 412, the process 400 may include sending a command to the one or more devices to revert device state. For example, a command generator may generate the command to cause device state reversion on the selected device, and this command may be sent to the selected device.

Returning to block 404, in examples where machine learning techniques will be used, the process 400 may include, at block 414, querying devices associated with the account data at issue for a current device state of the devices. This operation may be performed in the same or a similar manner as the operation performed at block 408.

At block 416, the process 400 may include utilizing machine learning techniques to predict one or more target devices to revert device state on. For example, the state reversion component may query one or more models for an indication of which device to select as the target device. The models may be trained to utilize various types of data to determine which device associated with account data is likely the target device for the undo command. The model(s) may utilize one or more data input types to determine the target device. Those data input types may include, for example, data from an activity database, data from a presence component, and/or data from one or more additional devices. The activity database may include historical device state information, including when devices have transitioned states previously. The activity database may also include timing data indicating when the devices transitioned states. The activity database may also include device affinity data indicating which devices are typically used to control other devices in an environment. For example, a given voice interface device may typically be used to control a first connected device while a different voice interface device may typically be used to control a second connected device. In addition to the above, the presence component may be configured to determine environments where user presence is and/or is not currently detected. The presence component may also be configured to detect certain conditions of an environment, such as brightness levels, activity states of an environment as a whole, etc. Additionally, the additional databases may include feedback data indicating user reactions to prior device state changes, as well as other potential inputs to the model(s), including inputs that are determined to be relevant by one or more machine learning models.

The model(s) may query the various databases and components to receive some or all of the input types described above, and the model(s) may query the devices associated with given account data for current device states of those devices. Utilizing some or all of this information, the model(s) may determine which of the devices associated with the account data is to be selected as the target device. By way of example, the model(s) may determine that while multiple devices recently change device states, a given device is located in a room where user presence is detected and thus that device may be selected as the target device. In other examples, the model(s) may determine that while user presence is detected in a first room with a first device, the undo request was received from a voice interface device located in a second room with a second device and may select the second device as the target device. Additional examples of how the models may utilize the data described herein to select a target device are provided below.

The process 400 may then continue to block 412, where a command may be sent to the one or more devices to revert device state, as described more fully above.

Figure 5:
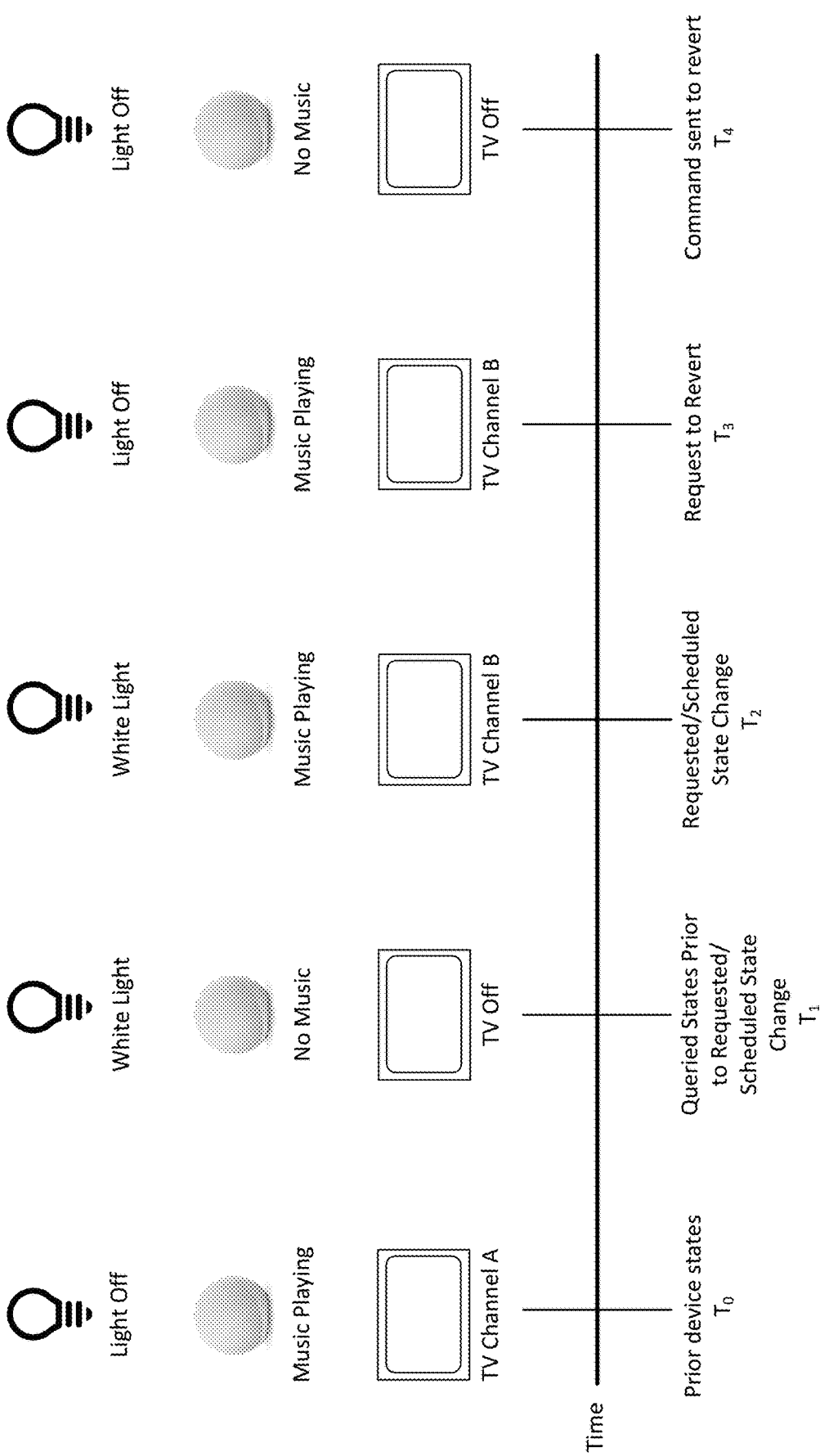
FIG. 5 illustrates a conceptual diagram of example devices changing state over time and how device state reversion may impact such devices.

FIG. 5 illustrates a conceptual diagram of example devices changing state over time and how device state reversion may impact the depicted devices. FIG. 5 shows a timeline from $T_0$ to $T_4$ with multiple devices in multiple device states. Indications of the device states of the depicted devices are also presented, and as shown at least a portion of those device states change over time. These device states and device state changes may be utilized by the systems described herein to select a target device to perform device state reversion with and/or to determine the device state to revert a device to.

For example, at time $T_0$, a light device, an audio-output device, and an image-output device may be respective states. For example, the light device may be in an off state, the audio-output device may be in a state where music is playing, and/or the image-output device may be in a state where given images, here images associated with Channel A, are being output. At time $T_1$ a state capture component as described more fully herein may be configured to query device states of the devices just prior to a scheduled device state change for at least one of the devices. In this example, when the state capture component queries the devices, the light device is in a state where while light is being emitted, the audio-output device is in a state where no music is being output, and the image-output device is in an off state. This prior state data may be returned to the state capture component and may be stored in a state database as described herein.

At time $T_2$, the requested and/or scheduled operation of one or more of the devices may take place and cause a device state change for at least one of the devices. In this example, a first command is sent to the audio-output device that causes the audio-output device to transition from an off state to a state where music is playing, and a second command is sent to the image-output device that causes the image-output device to transition from an off state to a state where images associated with Channel B are being output. Note that in this example no command is sent to the light device and as such the state of the light device is maintained as a state where white light is being emitted.

At time $T_3$, a request to revert a device state of a target device may be received, such as by user input requesting to "undo" and/or "stop." Note that at the time of the undo request, the audio-output device and the image-output device are in the same state as they were at $T_2$ when the requested and/or scheduled state change occurred. However, the light device is in a different state than at $T_2$, specifically in this example the light device is in an off state. At time $T_3$, the one or more processes to select device to revert device state on may be performed as described more fully herein. The result of those processes may be based at least in part on the prior state data from time $T_1$ as well as the state data at time $T_2$ and current state data at time $T_3$. In this example, the system may determine that differences in device states were present with respect to the audio-output device and the image-output device, but not the light device and that those devices are still in the state they transitioned to from the requested and/or scheduled state change. As such, the system may select the audio-output device and the image-output device to revert device states. Of note, the system may determine that while a state change occurred with respect to the light device at some point between time $T_2$ and time $T_3$, that state change was not caused by the requested and/or scheduled state change and thus may not be the target device of the undo request. In still other examples, presence data, other timing data, prior use data, device affinity data, etc. may also indicate that the light device is not a target device of the undo request.

At time $T_4$, having selected the audio-output device and the image-output device as the target devices from the undo request, a command may be sent to each of the devices to cause the devices to revert their device states to a state at time $T_1$. Here, the determination to revert device states to those shown at $T_1$ may be based at least in part on the prior device state data being present, prior historical data on device states, presence data, etc. Note that while at least some of the devices are in a different state at time $T_1$ than at time $T_0$, the states at time $T_1$ may be selected based at least in part on those states being associated with a timing indicator that is closer in time to time $T_2$ than those at time $T_0$.

Figure 6:
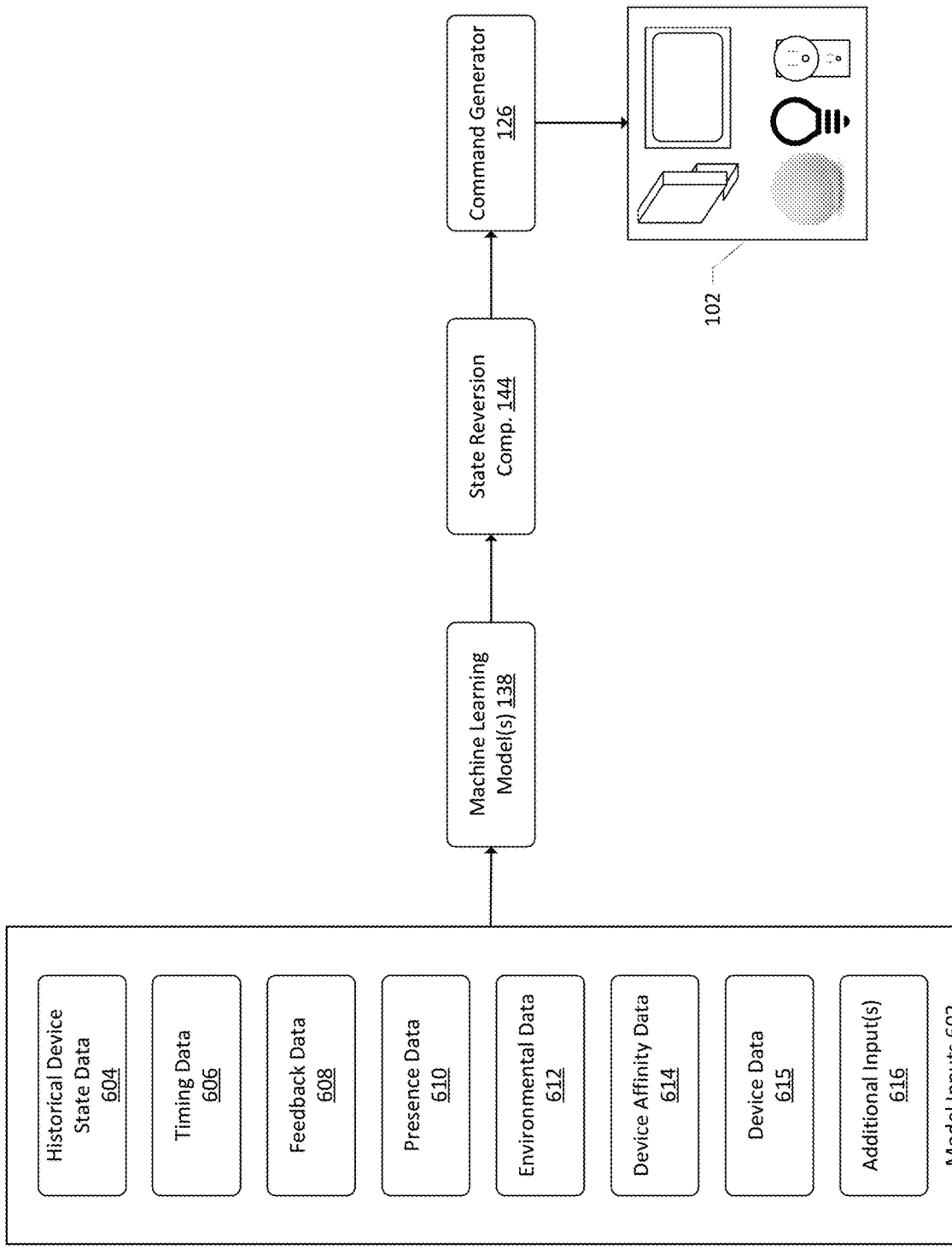
FIG. 6 illustrates a conceptual diagram of example components and data that may be utilized to perform device state reversion.

FIG. 6 illustrates a conceptual diagram of example components and data that may be utilized to perform device state reversion. FIG. 6 may include the same or similar components as described with respect to FIG. 1. For example, FIG. 6 may include a command generator 126, devices 102, a state reversion component 144, and/or one or more machine learning models 138. FIG. 6 may also include model inputs 602, which may include historical device state data 604, timing data 606, feedback data 608, presence data 610, environmental data 612, device affinity data 614, device data 615, and/or one or more additional inputs 616. The components of FIG. 6 may be utilized to select a device to revert device state on in response to an undo request.

By way of example, prior state data as collected by the state capture component described herein may not be available and/or more than one device 102 may have recently transitioned states. In these and other examples, modeling techniques, including the use of machine learning models 138, may be utilized to determine the target device to revert state on and/or to determine the requested state to be reverted to. For example, the state reversion component 144 may query one or more models 138 for an indication of which device 102 to select as the target device. The models 138 may be trained to utilize various types of data 602 to determine which device 102 associated with account data is likely the target device for the undo command. By way of example, the historical device state data 604 may indicate historical devices states of a given device at the time in question. For example, the historical device state data 604 may indicate that a given light device is historically in an off state at 5:00 pm on weekdays. The timing data 606 may indicate times when device state changes occur, times when user utterances to cause devices to perform actions are received, etc. The feedback data 608 may include data that indicates user feedback when devices change state historically. The presence data 610 may include indications of which portions of an environment are associated with detected user presence and/or which portions of the environment are not associated with presence. This may include which devices are associated with detection of user presence and/or not associated with detection of user presence. The environmental data 612 may indicate conditions of an environment in question, such as activity states, brightness levels, activity indicators, etc. The device affinity data 614 may include data that indicates which voice interface devices are most frequently used to control given connected devices. For example, a given voice interface device may typically be used to control a first connected device while a different voice interface device may typically be used to control a second connected device. In addition to the above, the presence component may be configured to determine environments where user presence is and/or is not currently detected. The device data 615 may include any data associated with the devices at issue. For example, the device data 615 may include device identifiers, device type identifiers, data indicating associations between devices such as which devices are in communication with each other, which devices are grouped together into one or more device groups, which devices are associated with given account data, etc. The additional inputs 616 may include any other inputs that may be utilized by the model(s) 138 to select a device as a target device of an undo request, including inputs that are determined to be relevant by one or more machine learning models 138.

The model(s) 138 may query the various databases and components to receive some or all of the input types 602 described above, and the model(s) 138 may query the devices 102 associated with given account data for current device states of those devices 102. Utilizing some or all of this information, the model(s) 138 may determine which of the devices 102 associated with the account data is to be selected as the target device. By way of example, the model(s) 138 may determine that while multiple devices 102 recently changed device states, a given device 102 is located in a room where user presence is detected and thus that device 102 may be selected as the target device. In other examples, the model(s) 138 may determine that while user presence is detected in a first room with a first device, the undo request was received from a voice interface device located in a second room with a second device and may select the second device as the target device. The model(s) 138 may also determine which of the several devices are controlled most frequently by the voice interface device that received the user utterance and may select one of those devices as the target device.

Once a device 102 is selected, the state reversion component 144 may provide, to the command generator 126, an indication of the selected device and/or an indication of the device state to revert to. The command generator 126 may generate a corresponding command and send the command to the selected device 102 to cause the device to revert device state.

FIGS. 7-11 illustrates processes for device state reversion. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6 and 12-14, although the processes may be implemented in a wide variety of other environments, architectures and systems.

Figure 7:
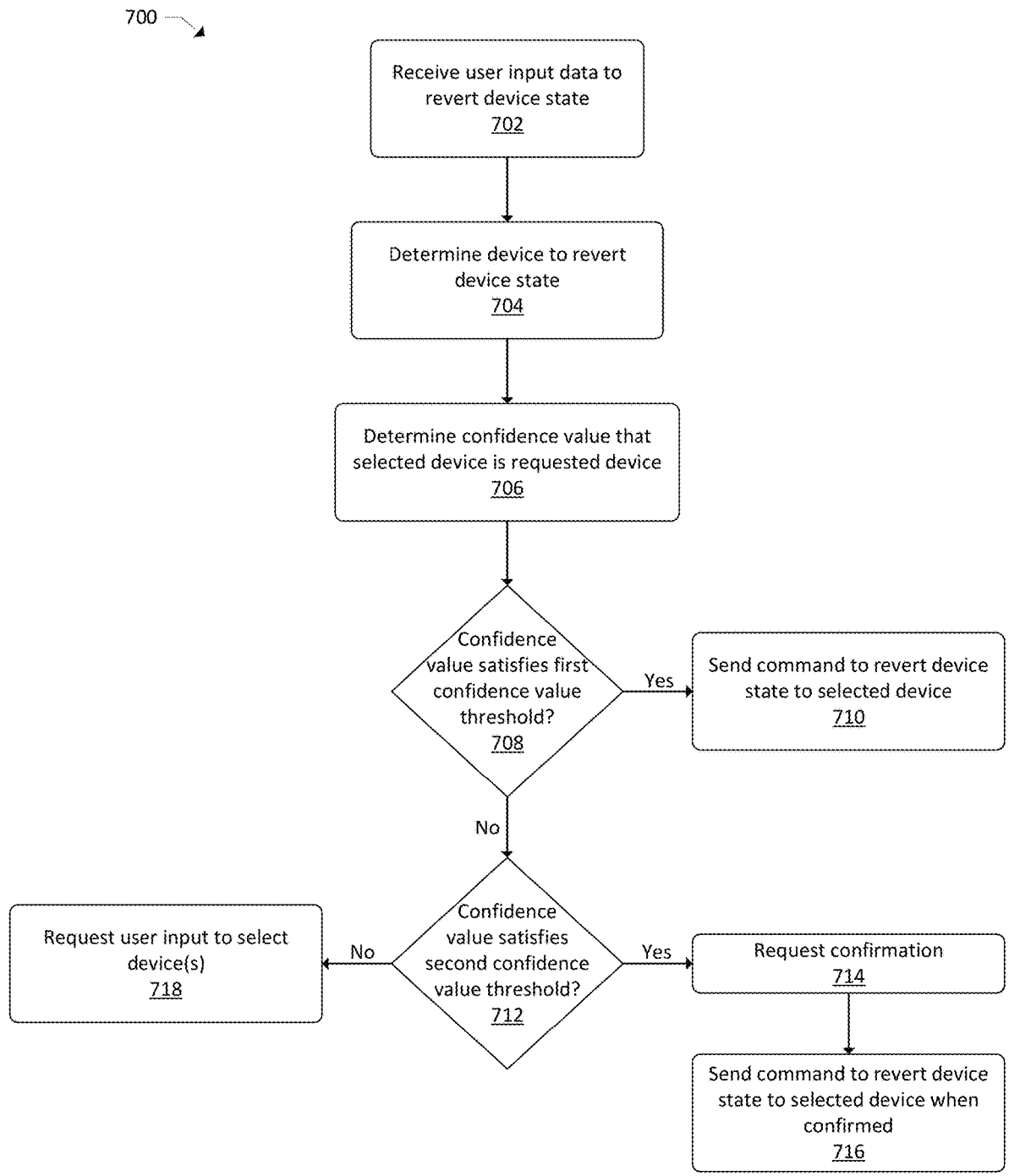
FIG. 7 illustrates a flow diagram of an example process for determining confidence values associated with device state reversion, and utilizing those confidence values to determine when device state reversion should be performed.

FIG. 7 illustrates a flow diagram of an example process 700 for determining confidence values associated with device state reversion, and utilizing those confidence values to determine when device state reversion should be performed. The order in which the operations or steps are described is not intended to be construed as a limitation, and any number of the described operations may be combined in any order and/or in parallel to implement process 700.

At block 702, the process 700 may include receiving user input data requesting to revert device state of one or more devices. As indicated above, sometimes this user input data explicitly indicates the device to revert state on. By way of example, the user may state "turn bedroom light back on." In this example, the user input data explicitly indicates the target device to revert state on, herein "bedroom light," and also explicitly indicates the requested state, here an "on" state. However, in other examples, the user input data may simply be "undo," "stop," "I don't want that," etc. In these examples, while the intent to undo an action that has been performed is explicit, the target device to revert state on and the state to revert to are not explicit. As such, to determine the target device to revert state on and/or the specific state to revert to, a state reversion component may be configured to first receive the user input data. In some examples, the user input data corresponds to speech input where the user says "undo" or an equivalent. In these examples, a speech processing system may be configured to receive audio data representing the speech input and may determine that the speech input includes an undo intent and may query the state reversion component to perform operations based at least in part on identifying the undo intent. In other examples, the user input data may be provided through a GUI or other non-speech methodologies and the system may utilize that user input data to query the state reversion component.

At block 704, the process 700 may include determining a device that is to have its device state reverted. For example, when prior state data is captured such as by a state capture component as described more fully herein, that prior state data along with current device state data may be utilized to determine the selected device that is the target of the undo request. In other examples, the one or more machine learning techniques described herein more fully may be utilized to select the target device.

At block 706, the process 700 may include determining a confidence value that the selected device is the requested device from the user input data. For example, the system may determine that only one device changed state in response to a requested and/or scheduled device state change and that other devices associated with the environment have maintained their states. In this example, the confidence value that the selected device is the target device of the undo request may be high or otherwise indicate a high confidence. In other examples, the system may indicate that multiple devices could potentially be the target device, but that one of those device was selected based on the data types and analysis described herein. In this example, the confidence value may be lower or otherwise indicate a lower degree of confidence that the selected device is the target device. It should be understood that while the example provided in FIG. 7 includes the selection of a single device as the target device of an undo request, more than one device may be selected and, as described below, confidence scores may be generated for the selection of those multiple devices. These confidence scores may be combined or otherwise aggregated to determine an aggregated confidence value that the selected devices are the target devices of the undo request at issue.

At block 708, the process 700 may include determining whether the confidence value satisfies a first threshold confidence value. This first threshold confidence value threshold may be set where confidence values that satisfy the threshold indicate sufficiently high confidence that the selected device is the target device and the device state of the device can be reverted without additional user input.

In examples where the confidence value satisfies the first confidence value threshold, the process 700 may include, at block 710, sending a command to revert device state to the selected device. In this example, no additional user input is needed and the command to revert device state is sent to the selected device to cause device state reversion.

In examples where the confidence value does not satisfy the first confidence value threshold, the process 700 may include, at block 712, determining whether the confidence value satisfies a second confidence value threshold. This second confidence value threshold may indicate that while a given confidence value does not satisfy the first confidence value threshold for cause device state reversion without user input, the given confidence value is still sufficient high to where the system reasonably predicts that the selected device is likely the target device.

In examples where the confidence value satisfies the second confidence value threshold, the process 700 may include, at block 714, requesting confirmation that the selected device in the device requested from the user input data. The confirmation request may be in the form of audio output on a voice interface device and/or in the form of a visual output where a user uses a graphical user interface to confirm or reject the confirmation.

At block 716, the process 700 may include sending a command to revert the device state to the selected device when responsive data to the request is received that confirms the selected device is the requested device. In this example, the user has confirmed that the selected device is the target device intended by the undo request, and thus the command may be sent to the selected device to cause device state reversion.

Returning to block 712, in examples where the confidence value does not satisfy the second confidence value threshold, the process 700 may include, at block 718, requesting user input to select the target device(s). For example, in this situation the system may not have determined with reasonable enough confidence that any given device should be selected as the target device. However, it would be beneficial to still perform an action in response to the undo request. As such, instead of requesting that a user provide confirmation that a given device is the target device, the system may cause output of a request for user input indicating more explicitly what the target device should be. For example, audio may be output such as "which device would you like to undo?" The user may provide responsive input and that input may be utilized to determine the target device of the undo request. In other examples, the system may refrain from performing device state reversion when the confidence value of a selected device is not sufficient.

Figure 8A:
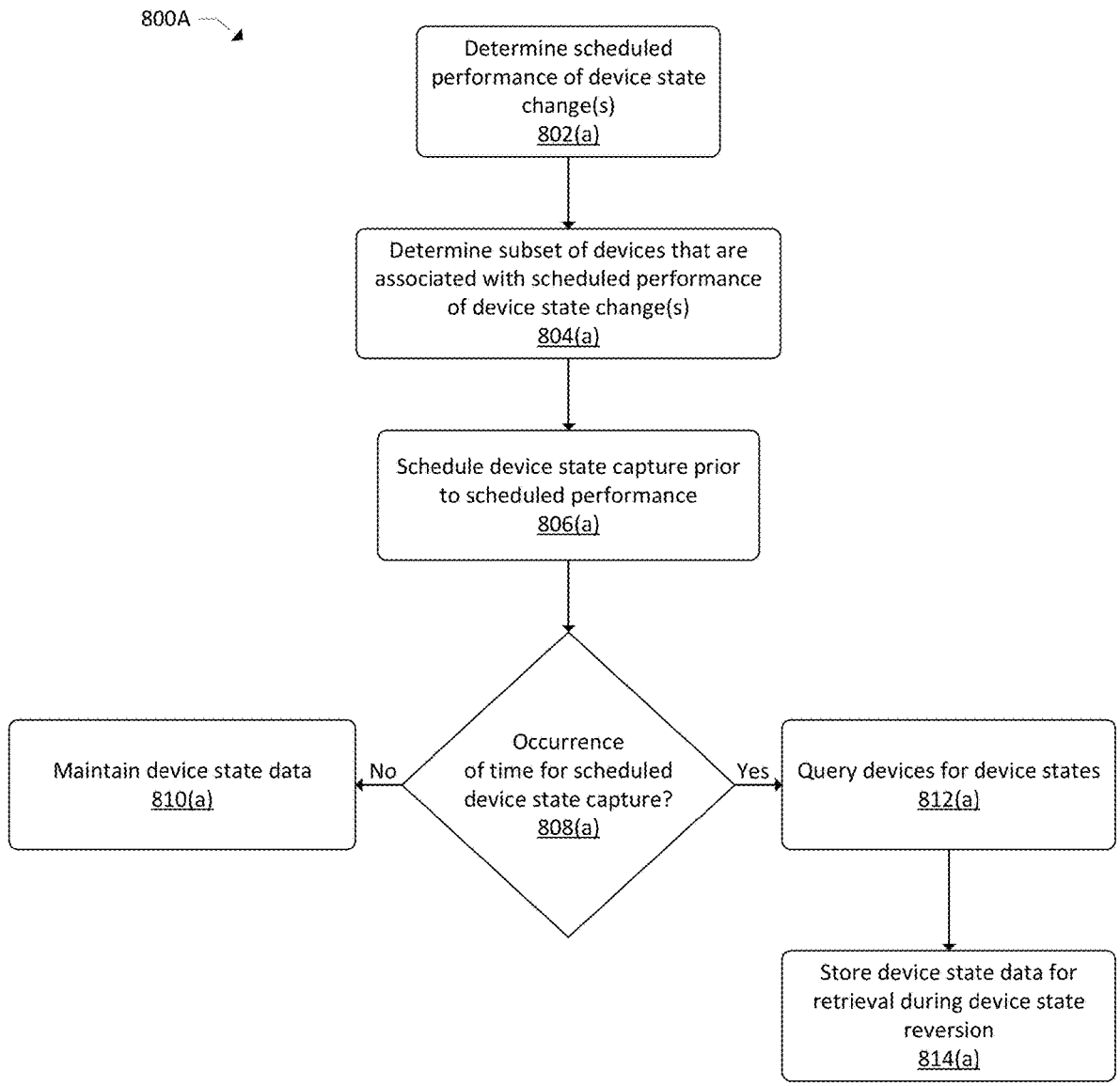
FIG. 8A illustrates a flow diagram of an example process for determining which devices to query for current device state during device state reversion.

FIG. 8A illustrates a flow diagram of an example process 800A for determining which devices to query for current device state during device state reversion. The order in which the operations or steps are described is not intended to be construed as a limitation, and any number of the described operations may be combined in any order and/or in parallel to implement process 800.

At block 802(a), the process 800A may include determining when scheduled performance of device state changes will occur. For example, a user may provide a user utterance requesting that a device transition from a first device state to a second device state, such as a light turning from on to off. Alternatively, one or more routines may indicate that the device is scheduled to transition from the first device state to the second device state. Whether using a routine, specific user input, or otherwise, a command generator may be configured to receive data indicating that the device state change is to occur and may generate a command to cause the device(s) in question to transition device states. This command may be sent to the device(s) at issue, which may cause the device(s) to perform the action indicated by the command, such as transitioning from the first device state to the second device state.

At block 804(a), the process 800A may include determining a subset of devices associated with given account data that are associated with the scheduled performance of the device state changes. For example, when the device state change is in response to an on-the-fly user request, the user may indicate which device(s) are to transition device states. In other examples where the device state change is in response to a routine being performed, the routine may indicate the device(s) that are to transition device state. These devices may be a subset of all devices associated with given account data and/or a given environment.

At block 806(a), the process 800A may include scheduling a device state capture prior to the scheduled performance of the device state changes. For example, the scheduled device state change is to occur at a given time, a state capture component may schedule or otherwise query the selected device(s) for their device states at a time just prior to when the requested and/or scheduled device state is to occur.

At block 808(a), the process 800A may include determining whether occurrence of the time for the scheduled device state capture is occurring. For example, when the device state change is user requested on the fly, that time may be selected as when the scheduled device state is occurring. When the device state change is pursuant to a routine, determination of whether the timing and/or other conditions for performance of the routine have been met such that the routine will be performed.

In examples where the time for the scheduled device state capture is not occurring, the process 800A may include, at block 810(a), maintaining the device state data as typically performed by the system. In this example, device state data is not yet collected at least because device state changes that are unassociated with the scheduled device state change may occur until just prior to when the scheduled device change occurs. As such, any already-collected device state data may be maintained without addition by the state capture component as described herein.

In examples where the time for the scheduled device state capture is occurring, the process 800A may include, at block 812(a), querying one or more devices associated with the account data for a current device state. Querying the devices may include querying just the devices associated with the scheduled device state change and/or all or some of the devices associated with the account data at issue and/or the environment at issue.

At block 814(a), the process 800A may include storing the device state data in a database for retrieval during device state reversion processing. For example, the device state data may be stored in a state database as described herein for use in selecting a device as a target device in response to an undo request.

Figure 8B:
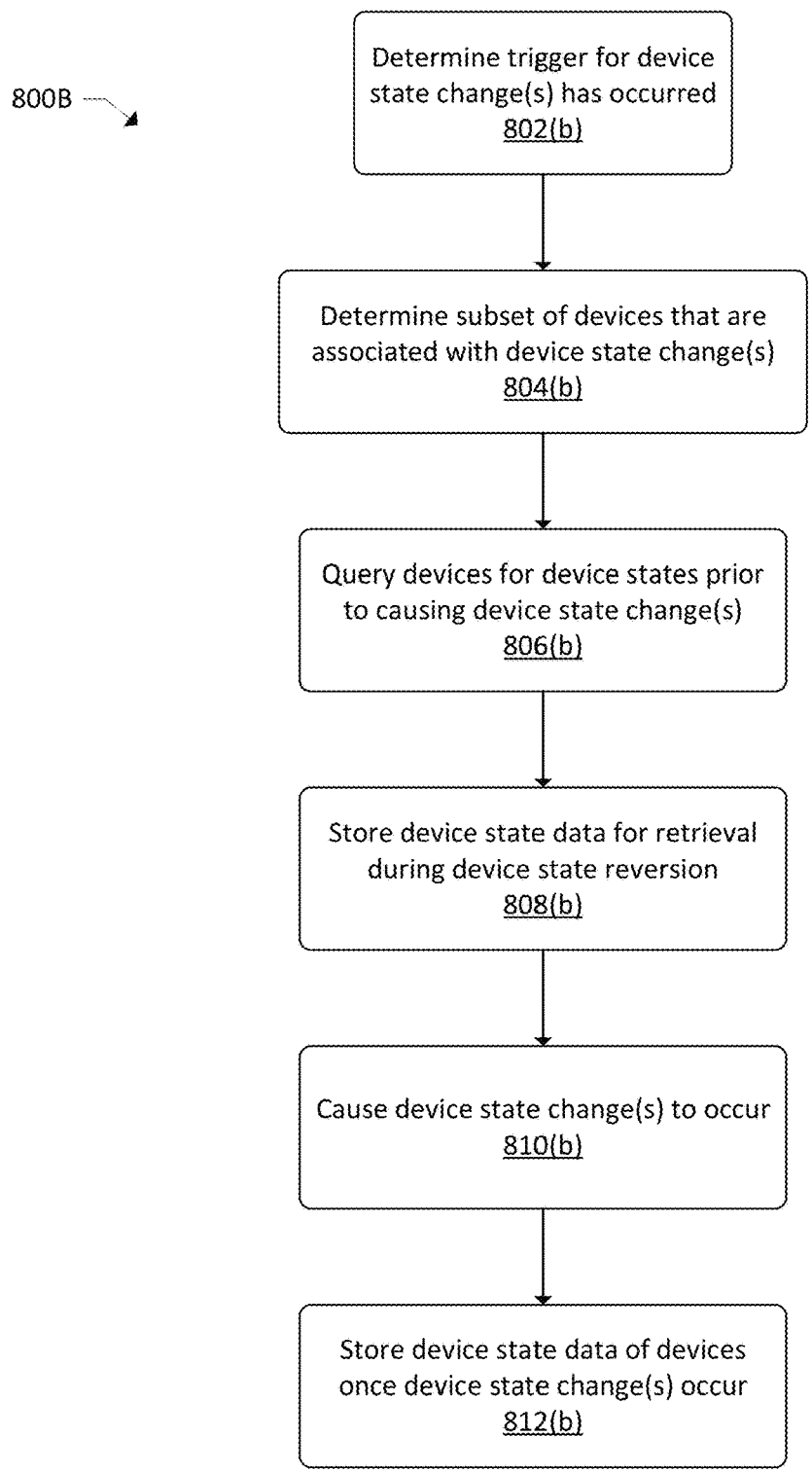
FIG. 8B illustrates a flow diagram of an example process for determining prior device states based at least in part on a trigger to change device state.

FIG. 8B illustrates a flow diagram of an example process 800B for determining prior device states based at least in part on a trigger to change device state. The order in which the operations or steps are described is not intended to be construed as a limitation, and any number of the described operations may be combined in any order and/or in parallel to implement process 800.

At block 802(b), the process 800B may include determining that a trigger for device state change(s) has occurred. For example, a user may provide a user utterance requesting that a device transition from a first device state to a second device state, such as a light turning from on to off. Alternatively, one or more routines may indicate that the device is scheduled to transition from the first device state to the second device state. Whether using a routine, specific user input, or otherwise, a command generator may be configured to receive data indicating that the device state change is to occur and may generate a command to cause the device(s)

in question to transition device states. This command may be sent to the device(s) at issue, which may cause the device(s) to perform the action indicated by the command, such as transitioning from the first device state to the second device state.

At block 804(*b*), the process 800B may include determining a subset of devices associated with given account data that are associated with the device state changes. For example, when the device state change is in response to an on-the-fly user request, the user may indicate which device(s) are to transition device states. In other examples where the device state change is in response to a routine being performed, the routine may indicate the device(s) that are to transition device state. These devices may be a subset of all devices associated with given account data and/or a given environment.

At block 806(*b*), the process 800B may include querying one or more devices associated with the account data for a current device state. Querying the devices may include querying just the devices associated with the scheduled device state change and/or all or some of the devices associated with the account data at issue and/or the environment at issue.

At block 808(*b*), the process 800B may include storing the device state data in a database for retrieval during device state reversion processing. For example, the device state data may be stored in a state database as described herein for use in selecting a device as a target device in response to an undo request.

At block 810(*b*), the process 800B may include causing the device state change(s) to occur based at least in part on the trigger having been determined to have occurred. For example, a command generator may generate the command to cause device state reversion on the selected device, and this command may be sent to the selected device.

At block 812(*b*), the process 800B may include storing device state data of devices once the device state change(s) occur. For example, in a similar manner to how the device state snapshot of the devices at issue was generated for device state data prior to the device state change(s), a device state snapshot of the device once the triggered device state change(s) occur may be captured and saved.

Figure 9:
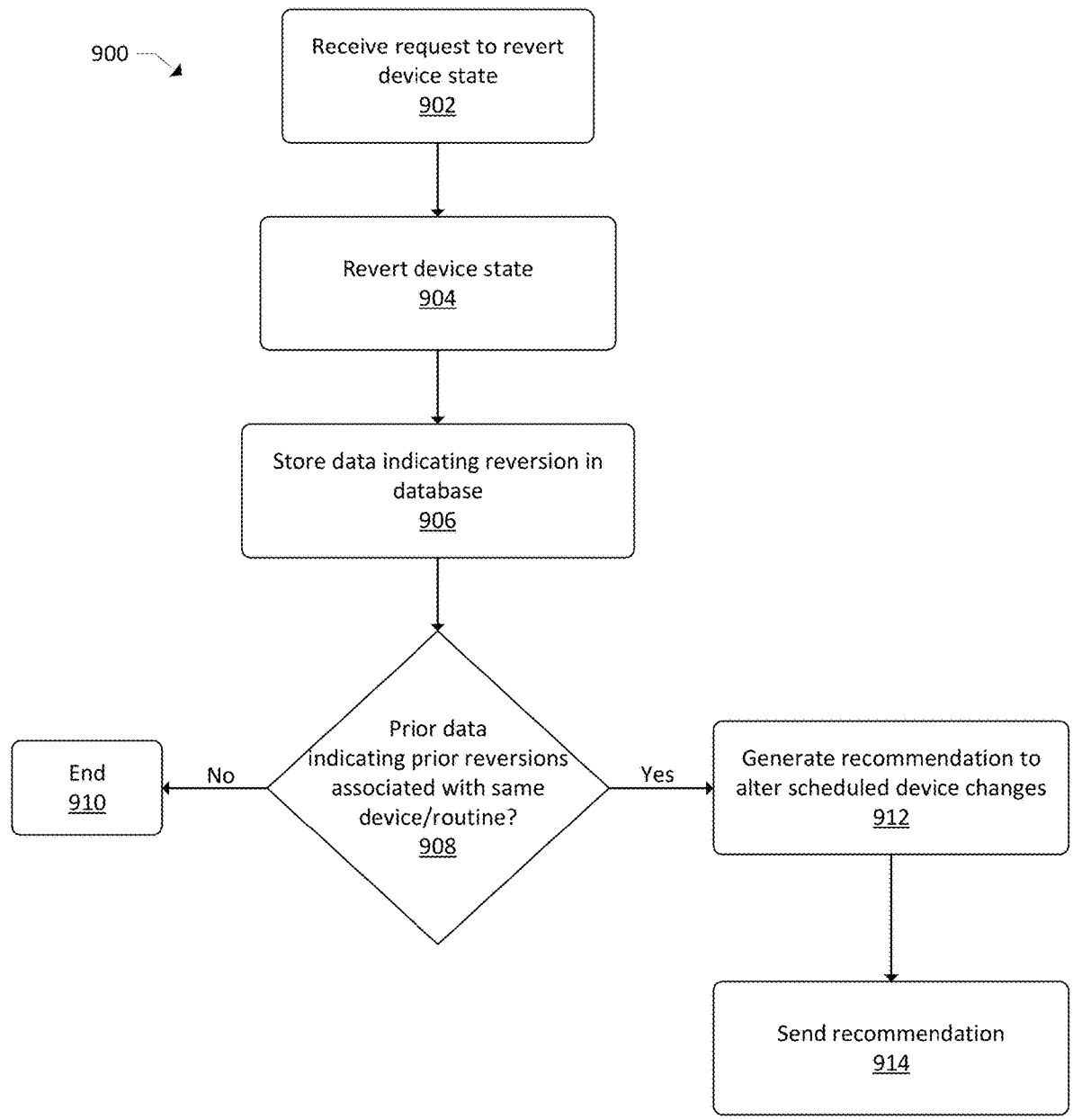
FIG. 9 illustrates a flow diagram of an example process for generating a recommendation to alter scheduled device control based on device state reversions.

FIG. 9 illustrates a flow diagram of an example process 900 for generating a recommendation to alter scheduled device control based on device state reversions. The order in which the operations or steps are described is not intended to be construed as a limitation, and any number of the described operations may be combined in any order and/or in parallel to implement process 900.

At block 902, the process 900 may include receiving a request to revert a device state of a device. As indicated above, sometimes this user input data explicitly indicates the device to revert state on. By way of example, the user may state "turn bedroom light back on." In this example, the user input data explicitly indicates the target device to revert state on, herein "bedroom light," and also explicitly indicates the requested state, here an "on" state. However, in other examples, the user input data may simply be "undo," "stop," "I don't want that," etc. In these examples, while the intent to undo an action that has been performed is explicit, the target device to revert state on and the state to revert to are not explicit. As such, to determine the target device to revert state on and/or the specific state to revert to, a state reversion component may be configured to first receive the user input data. In some examples, the user input data corresponds to speech input where the user says "undo" or an equivalent. In these examples, a speech processing system may be configured to receive audio data representing the speech input and may determine that the speech input includes an undo intent and may query the state reversion component to perform operations based at least in part on identifying the undo intent. In other examples, the user input data may be provided through a GUI or other non-speech methodologies and the system may utilize that user input data to query the state reversion component.

At block 904, the process 900 may include reverting the device state of the requested device. For example, if prior state data was captured such as by a state capture component as described above, the prior state data and queried current state data of devices may be utilized to select a device as a target device associated with the undo request. In other examples, the machine learning techniques described above may be utilized to select the target device and/or to determine the device state to revert the target device to.

At block 906, the process 900 may include storing data indicating the device state reversion in a database. For example, the data may indicate the target device to which device state reversion was performed, what the device state of the device was prior to the state reversion, and/or what the device state of the device was after the device state reversion. The data may also include the user input data requesting device state reversion and/or timing data associated with the request.

At block 908, the process 900 may include determining whether prior data indicating prior device state reversions for the device and/or a given routine is present. For example, the database may include the data from the undo request at issue as well as data associated with prior undo requests. Some of those prior undo requests may not be associated with the device(s) at issue, the routine at issue, the on-the-fly user request at issue, etc. However, some of the prior device state reversions may be associated with the device state reversion that just occurred, and the system may determine whether such prior device state reversions data is present in the database.

In examples where such prior data is not available, the process 900 may end at block 910. Here, the device state reversion request was made only once and thus not enough data may be present to suggest that a routine and/or other operation performed by the system be altered based on device state reversions.

In examples where such prior data is available, the process 900 may include, at block 912, generating a recommendation to alter scheduled device state changes. For example, the prior device state reversion data may indicate that a user has provided an undo request multiple times in response to the same routine being performed and/or in response to one or more other actions being performed with respect to a given device or set of devices. This may indicate that the user has had to provide an undo request multiple times, leading to a negative user experience. Based at least in part on this data, the system may generate a recommendation to alter the scheduled device state changes in an attempt to mitigate the need for the user to provide future undo requests. Example recommendations may be to remove a device from the devices associated with a scheduled device state change, altering how the device state changes when the routine is performed, etc.

At block 914, the process 900 may include sending the recommendation to a device associated with the account data for presentation of the recommendation. The recommendation may be output and functionality may be presented for a user to accept or reject the recommendation. When accepted, data indicating the altered routine or otherwise the scheduled device state change may be generated and utilized in place of the previous data for scheduled device state changes.

Figure 10:
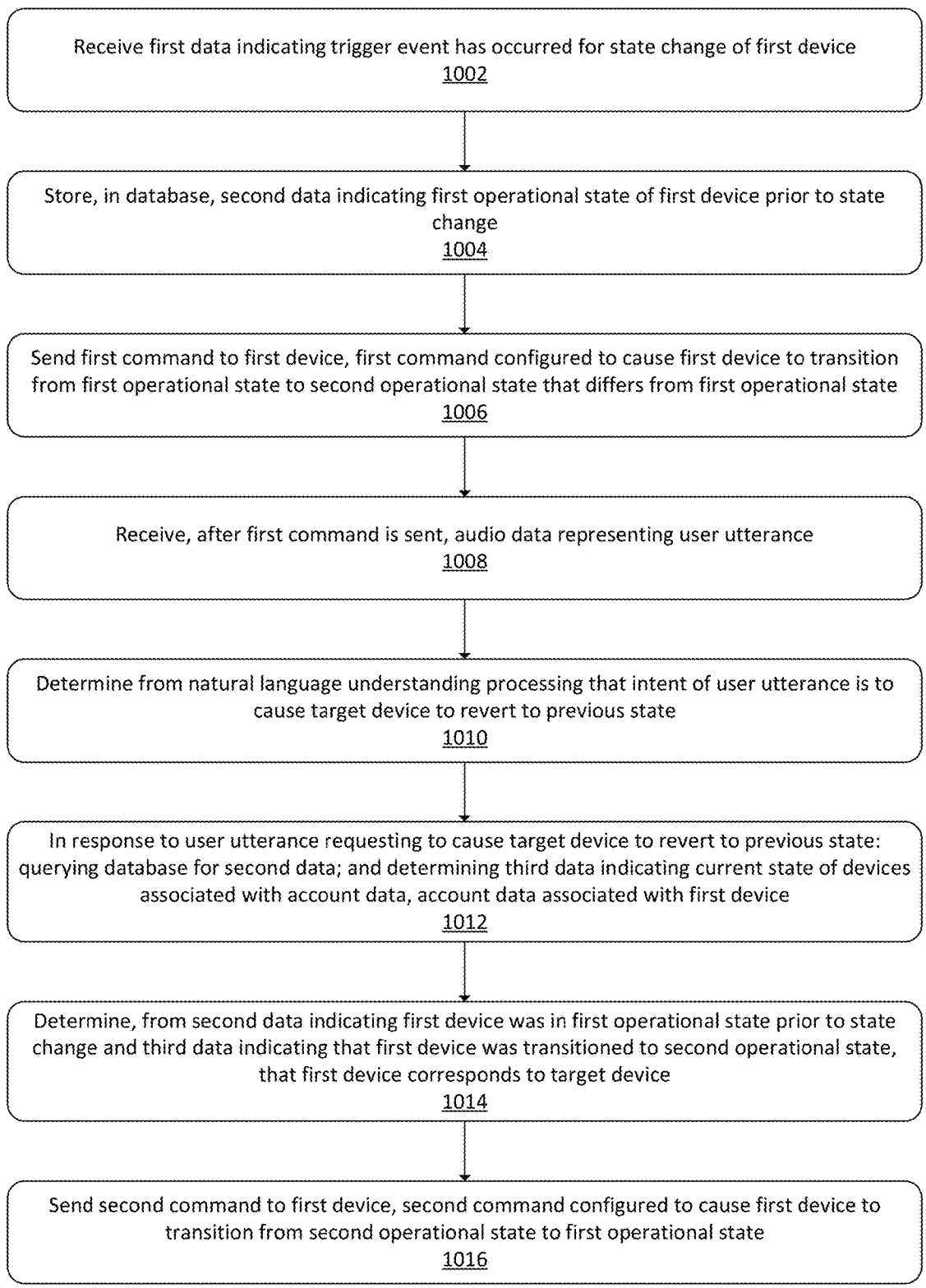
FIG. 10 illustrates a flow diagram of an example process for device state reversion.

FIG. 10 illustrates a flow diagram of an example process 1000 for device state reversion. The order in which the operations or steps are described is not intended to be construed as a limitation, and any number of the described operations may be combined in any order and/or in parallel to implement process 1000.

At block 1002, the process 1000 may include receiving first data indicating a trigger event has occurred for a state change of a first device. For example, a user may provide a user utterance requesting that a device transition from a first device state to a second device state, such as a light turning from on to off. Alternatively, one or more routines may indicate that the device is scheduled to transition from the first device state to the second device state. Whether using a routine, specific user input, or otherwise, a command generator may be configured to receive data indicating that the device state change is to occur and may generate a command to cause the device(s) in question to transition device states. This command may be sent to the device(s) at issue, which may cause the device(s) to perform the action indicated by the command, such as transitioning from the first device state to the second device state.

At block 1004, the process 1000 may include storing, in a database, first data indicating the first operational state of the first device. For example, if the command to perform a device state change is associated with transitioning a device state of a first device and a second device, a state capture component may be configured to determine that a state of the first device and a state of the second device prior to the state change is to be determined. By way of example, the command may be to cause the first device to turn on and to cause the second device to turn off. Based at least in part on the devices associated with the command, the state capture component may query the first device and the second device for a state of those devices prior to the command being sent to cause the device state transition. In this example, the first device may return data indicating that its state prior to the command being received is an off state, and the second device may return data indicating that its state prior to the command being received is an on state. This prior state data may represent a "snapshot" of device states prior to state change commands being sent, and this prior state data may be stored in a state database. Once the prior state data is acquired, a component of the system may send the command to the device(s) at issue, which may cause the device(s) to perform the device state transition directed by the command. The device state data may be stored in a state database as described herein for use in selecting a device as a target device in response to an undo request.

At block 1006, the process 1000 may include sending a first command to the first device at the first time, the first command configured to cause the first device to transition from the first operational state to a second operational state that differs from the first operational state. For example, a command generator may generate the command to cause device state reversion on the selected device, and this command may be sent to the selected device.

At block 1008, the process 1000 may include receiving, after the first command is sent, audio data representing a user utterance. For example, a voice interface device may be configured to capture audio representing the user utterance and to generate audio data corresponding to the audio. This audio data may be utilized by a speech processing system to determine intent data indicating an intent of the user utterance.

At block 1010, the process 1000 may include determining that the user utterance requests to cause a target device to revert to a previous state. For example, the user utterance may include "undo," "stop," or other predefined words and/or phrases associated with a request to revert device state of a target device.

At block 1012, the process 1000 may include, in response to the user utterance requesting to cause the target device to revert to the previous state: querying the database for the second data; and determining third data indicating a current state of devices associated with account data, the account data associated with the first device. For example, the state database may be queried for the prior state data, which may be returned to a state reversion component configured to handle the undo request. Additionally, a state fetching component may be configured to query the devices associated with the account data for a current state of those devices.

At block 1014, the process 1000 may include determining, from the second data indicating the first device was in the first operational state prior to the state change and the third data indicating that the first device was transitioned to the second operational state, that the first device corresponds to the target device. For example, the prior state data may indicate that of the multiple devices associated with the account data in question, one device recently underwent a device state change from a first device state to a second device state, and the current device state data may indicate that the device is currently still in the second device state. Utilizing this data, the state reversion component may determine that the target device for the undo request is the first device, and that the undo request indicates that the first device should be transitioned back to the first device state. In examples, machine learning techniques as described more fully elsewhere herein may be utilized to select a given device as the target device.

At block 1016, the process 1000 may include sending a second command to the first device, the second command configured to cause the first device to transition from the second operational state to the first operational state. For example, the second command may indicate the selected device to revert device state on as well as the state to revert the target device to.

Additionally, or alternatively, the process 1000 may include storing fourth data indicating historical operational states of the first device, the historical operational states indicating when the first device is historically in the first operational state and when the first device is historically in the second operational state. The process 1000 may also include determining, from the fourth data and in response to the user utterance requesting to cause the target device to revert to the previous state, that the first device is historically in the first operational state during a period of time that includes when the undo request was received. In these examples, determining that the first device corresponds to the target device may be in response to the first device being historically in the first operational state during the period of time.

Additionally, or alternatively, the process 1000 may include determining that the trigger event corresponds to a routine that causes device state changes when the trigger event is detected. The process 1000 may also include determining a subset of the devices that are associated with the routine, the subset of the devices including the first device. In these examples, determining the first operational state of the first device may be in response to the first device being included in the subset of the devices.

Additionally, or alternatively, the process 1000 may include determining that user presence is detected in an environment where the first device is situated. The process 1000 may also include determining, in response to the user presence being detected in the environment, a subset of the devices that are associated with the environment, wherein the subset of the devices includes the first device. Determining the subset of the devices may be based at least in part on account data indicating an association between devices in the subset of the devices and the environment at issue. In these examples, determining that the first device corresponds to the target device may be in response to the first device being included in the subset of the devices.

Figure 11:
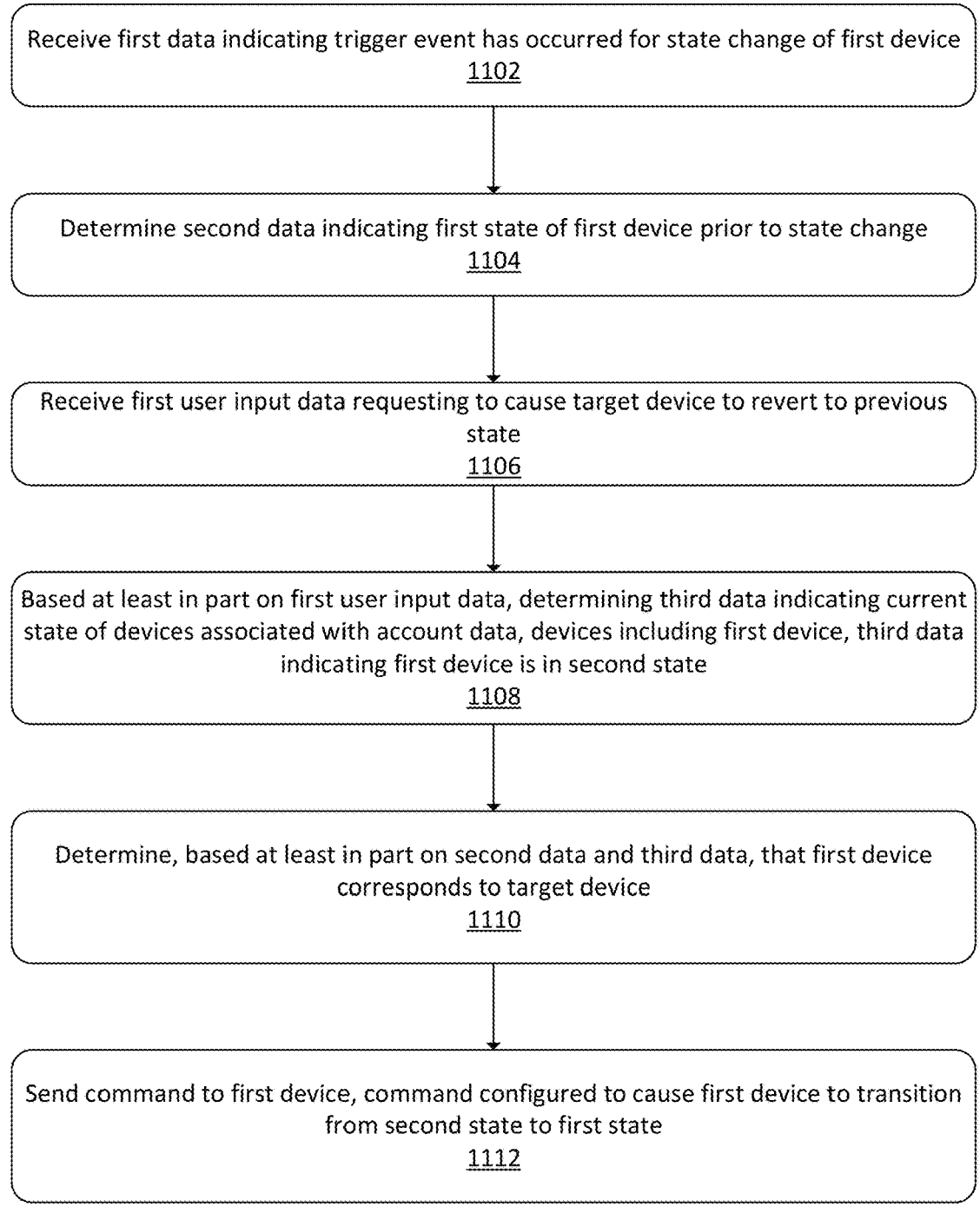
FIG. 11 illustrates a flow diagram of another example process for device state reversion.

FIG. 11 illustrates a flow diagram of another example process 1100 for device state reversion. The order in which the operations or steps are described is not intended to be construed as a limitation, and any number of the described operations may be combined in any order and/or in parallel to implement process 1100.

At block 1102, the process 1100 may include receiving first data indicating a trigger event has occurred for a state change of a first device. For example, a user may provide a user utterance requesting that a device transition from a first device state to a second device state, such as a light turning from on to off. Alternatively, one or more routines may indicate that the device is scheduled to transition from the first device state to the second device state. Whether using a routine, specific user input, or otherwise, a command generator may be configured to receive data indicating that the device state change is to occur and may generate a command to cause the device(s) in question to transition device states. This command may be sent to the device(s) at issue, which may cause the device(s) to perform the action indicated by the command, such as transitioning from the first device state to the second device state.

At block 1104, the process 1100 may include determining second data indicating a first state of the first device prior to the state change. For example, if the command to perform a device state change is associated with transitioning a device state of a first device and a second device, a state capture component may be configured to determine that a state of the first device and a state of the second device prior to the state change is to be determined. By way of example, the command may be to cause the first device to turn on and to cause the second device to turn off. Based at least in part on the devices associated with the command, the state capture component may query the first device and the second device for a state of those devices prior to the command being sent to cause the device state transition. In this example, the first device may return data indicating that its state prior to the command being received is an off state, and the second device may return data indicating that its state prior to the command being received is an on state. This prior state data may represent a "snapshot" of device states prior to state change commands being sent, and this prior state data may be stored in a state database. Once the prior state data is acquired, a component of the system may send the command to the device(s) at issue, which may cause the device(s) to perform the device state transition directed by the command.

At block 1106, the process 1100 may include receiving first user input data requesting to cause a target device to revert to a previous state. For example, a voice interface device may be configured to capture audio representing the user utterance and to generate audio data corresponding to the audio. This audio data may be utilized by a speech processing system to determine intent data indicating an intent of the user utterance. In other examples, the user input data may be provided by a graphical user interface instead of by speech input.

At block 1108, the process 1100 may include, based at least in part on the first user input data, determining third data indicating a current state of devices associated with account data, the devices including the first device, the third data indicating the first device is in a second state. For example, the state database may be queried for the prior state data, which may be returned to a state reversion component configured to handle the undo request. Additionally, a state fetching component may be configured to query the devices associated with the account data for a current state of those devices.

At block 1110, the process 1100 may include determining, based at least in part on the second data and the third data, that the first device corresponds to the target device. For example, the prior state data may indicate that of the multiple devices associated with the account data in question, one device recently underwent a device state change from a first device state to a second device state, and the current device state data may indicate that the device is currently still in the second device state. Utilizing this data, the state reversion component may determine that the target device for the undo request is the first device, and that the undo request indicates that the first device should be transitioned back to the first device state. In examples, machine learning techniques as described more fully elsewhere herein may be utilized to select a given device as the target device.

At block 1112, the process 1100 may include sending a command to the first device, the command configured to cause the first device to transition from the second state to the first state. For example, the second command may indicate the selected device to revert device state on as well as the state to revert the target device to.

Additionally, or alternatively, the process 1100 may include storing fourth data indicating historical operational states of the first device. The process 1100 may also include determining, using the fourth data and based at least in part on receiving the first user input data, that the first device is historically in the first state during a period of time that includes when the user input data was received. In these examples, determining that the first device corresponds to the target device may be based at least in part on the first device being historically in the first state during the period of time.

Additionally, or alternatively, the process 1100 may include determining that the trigger event corresponds to a routine that causes device state changes when the trigger event is detected. The process 1100 may also include determining a subset of the devices that are associated with the trigger event, the subset of the devices including the first device. In these examples, determining the first state of the first device may be based at least in part on the first device being included in the subset of the devices.

Additionally, or alternatively, the process 1100 may include determining that user presence is detected in an environment where the first device is situated. The process 1100 may also include determining, based at least in part on the user presence being detected in the environment, a subset of the devices that are associated with the environment, wherein the subset of the devices includes the first device. In these examples, determining that the first device corresponds to the target device may be based at least in part on the first device being included in the subset of the devices.

Additionally, or alternatively, the process 1100 may include determining that a third device transitioned from a third state to a fourth state in association with the trigger event. The process 1100 may also include determining that the first device is associated with the third device. The process 1100 may also include, based at least in part on the first user input data and the third device being associated with the first device, causing the third device to revert back to the third state.

Additionally, or alternatively, the process 1100 may include determining a first confidence value associated with determining that the first device corresponds to the target device. The process 1100 may also include determining that the first confidence value fails to satisfy a threshold confidence value for sending the command. The process 1100 may also include, based at least in part on the first confidence value failing to satisfy the threshold confidence value, causing output of a request to confirm that the first device corresponds to the target device. The process 1100 may also include receiving second user input data responsive to the request. In these examples, sending the command may be based at least in part on the second user input data.

Additionally, or alternatively, the process 1100 may include storing fourth data indicating the transition from the second state to the first state was in response to the first user input data. The process 1100 may also include determining, from fifth data, that prior reversions of the first device from the second state to the first state were in response to prior user input data. The process 1100 may also include, based at least in part on the fourth data and the fifth data, generating sixth data representing a recommendation to alter when the first device is transitioned from the first state to the second state.

Additionally, or alternatively, the process 1100 may include storing fourth data indicating that a transition of the first device from the second state to the first state was based at least in part on the first user input data. The process 1100 may also include receiving second user input data indicating a request to revert a device state. The process 1100 may also include determining, based at least in part on the fourth data and the second user input data, that the request to revert the device state is associated with transitioning the first device from the first state to the second state.

Figure 12:
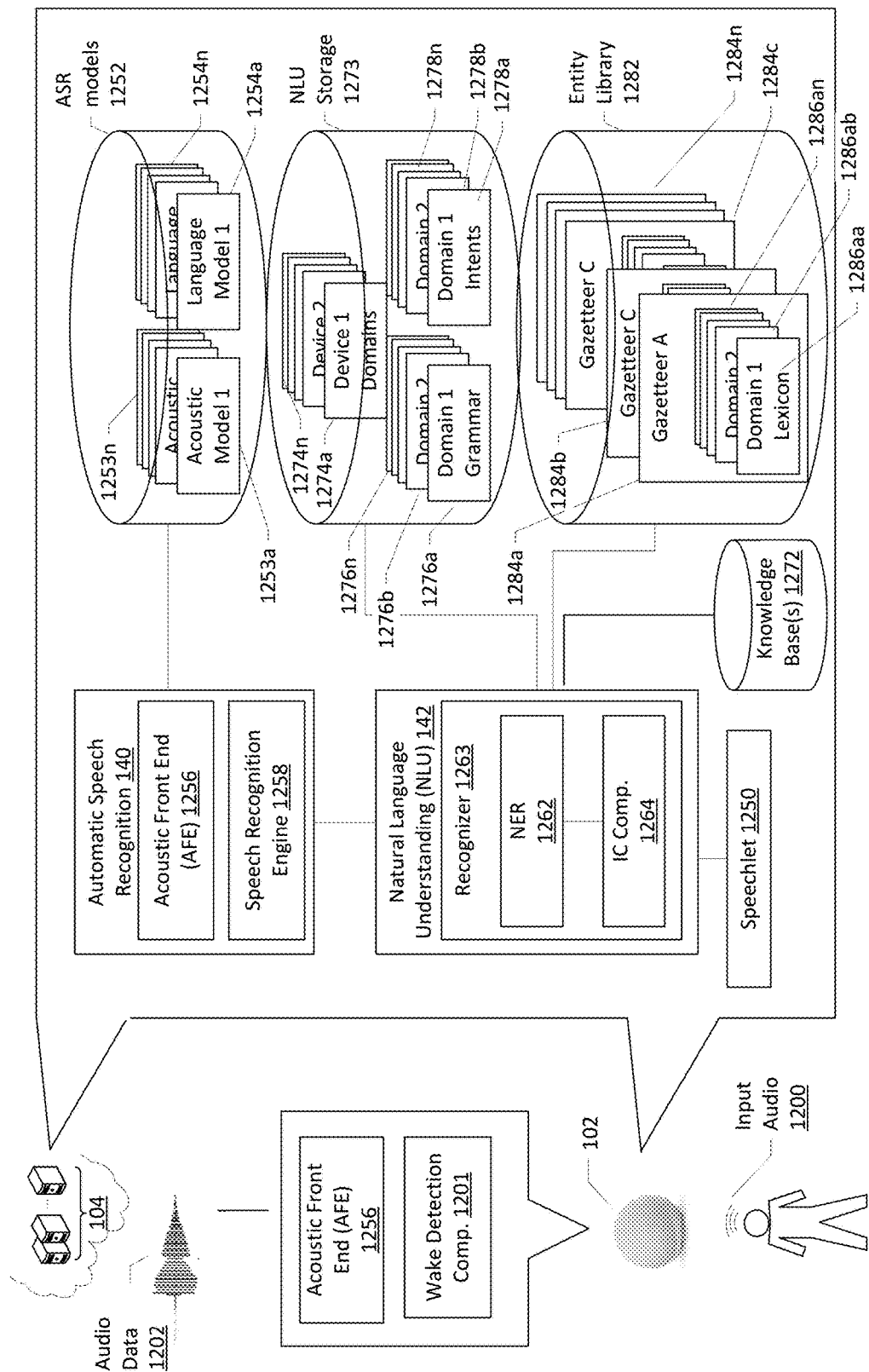
FIG. 12 illustrates a conceptual diagram of components of a speech-processing system for processing audio data provided by one or more devices.

FIG. 12 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 12 may occur directly or across a network 106. An audio capture component, such as a microphone 114 of the device 102, or another device, captures audio 1200 corresponding to a spoken utterance. The device 102, using a wake word engine 1201, then processes audio data corresponding to the audio 1200 to determine if a keyword (such as a wakeword) is detected in the audio data. Following detection of a wakeword, the device 102 processes audio data 1202 corresponding to the utterance utilizing an ASR component 140. The audio data 1202 may be output from an optional acoustic front end (AFE) 1256 located on the device prior to transmission. In other instances, the audio data 1202 may be in a different form for processing by a remote AFE 1256, such as the AFE 1256 located with the ASR component 140.

The wake word engine 1201 works in conjunction with other components of the user device, for example a microphone to detect keywords in audio 1200. For example, the device may convert audio 1200 into audio data, and process the audio data with the wake word engine 1201 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1201 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 1201 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake." The audio data 1202 may include data corresponding to the wakeword. Further, a local device may "wake" upon detection of speech/spoken audio above a threshold, as described herein. An ASR component 140 may convert the audio data 1202 into text. The ASR transcribes audio data into text data representing the words of the speech contained in the audio data 1202. The text data may then be used by other components for various purposes, such as executing system commands, inputting data, etc. A spoken utterance in the audio data is input to a processor configured to perform ASR which then interprets the utterance based on the similarity between the utterance and pre-established language models 1254 stored in an ASR model knowledge base (ASR Models Storage 1252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1253 stored in an ASR Models Storage 1252), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 140 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1256 and a speech recognition engine 1258. The acoustic front end (AFE) 1256 transforms the audio data from the microphone into data for processing by the speech recognition engine 1258. The speech recognition engine 1258 compares the speech recognition data with acoustic models 1253, language models 1254, and other data models and information for recognizing the speech conveyed in the audio data. The AFE 1256 may reduce noise in the audio data and divide the digitized audio data into frames representing time intervals for which the AFE 1256 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1258 may process the output from the AFE 1256 with reference to information stored in speech/model storage (1252). Alternatively, post front-end processed data (such as feature vectors) may be received by the device executing ASR processing from another source besides the internal AFE. For example, the user device may process audio data into feature vectors (for example using an on-device AFE 1256).

The speech recognition engine 1258 attempts to match received feature vectors to language phonemes and words as known in the stored acoustic models 1253 and language models 1254. The speech recognition engine 1258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, undo?" The wake detection component may identify the wake word, otherwise described as a trigger expression, "Alexa," in the user utterance and may "wake" based on identifying the wake word. The speech recognition engine 1258 may identify, determine, and/or generate text data corresponding to the user utterance, here "undo."

The speech recognition engine 1258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1258 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 142 may include various components, including potentially dedicated processor(s), memory, storage, etc. As shown in FIG. 12, an NLU component 142 may include a recognizer 1263 that includes a named entity recognition (NER) component 1262 which is used to identify portions of query text that correspond to a named entity that may be recognizable by the system. A downstream process called named entity resolution links a text portion to a specific entity known to the system. To perform named entity resolution, the system may utilize gazetteer information (1284a-1284n) stored in entity library storage 1282. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 140 based on the utterance input audio 1200) and attempts to make a semantic interpretation of the text. That is, the NLU process determines the meaning behind the text based on the individual words and then implements that meaning. NLU processing 142 interprets a text string to derive an intent or a desired action from the user as well as the pertinent pieces of information in the text that allow a device (e.g., device 102) to complete that action. For example, if a spoken utterance is processed using ASR 140 and outputs the text "undo" the NLU process may determine that the user intended to cause a device state of a device to revert back to what it was previously.

The NLU 142 may process several textual inputs related to the same utterance. For example, if the ASR 140 outputs N text segments (as part of an N-best list), the NLU may process all N outputs to obtain NLU results.

As will be discussed further below, the NLU process may be configured to parse and tag to annotate text as part of NLU processing. For example, for the text "undo," "undo" may be tagged as a command (to perform device state reversion).

To correctly perform NLU processing of speech input, an NLU process 142 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1262 receives a query in the form of ASR results and attempts to identify relevant grammars and lexical information that may be used to construe meaning. To do so, the NLU component 142 may begin by identifying potential domains that may relate to the received query. The NLU storage 1273 includes a database of devices (1274a-1274n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 1263, language model and/or grammar database (1276a-1276n), a particular set of intents/actions (1278a-1278n), and a particular personalized lexicon (1286). Each gazetteer (1284a-1284n) may include domain-indexed lexical information associated with a particular user and/or device. For example, the Gazetteer A (1284a) includes domain-index lexical information 1286aa to 1286an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1264 parses the query to determine an intent or intents for each identified domain, where the intent corresponds to the action to be performed that is responsive to the query. Each domain is associated with a database (1278a-1278n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1264 identifies potential intents for each identified domain by comparing words in the query to the words and phrases in the intents database 1278. In some instances, the determination of an intent by the IC component 1264 is performed using a set of rules or templates that are processed against the incoming text to identify a matching intent.

In order to generate a particular interpreted response, the NER 1262 applies the grammar models and lexical information associated with the respective domain to actually recognize a mention of one or more entities in the text of the query. In this manner, the NER 1262 identifies "slots" or values (i.e., particular words in query text) that may be needed for later command processing. Depending on the complexity of the NER 1262, it may also label each slot with a type of varying levels of specificity (such as noun, place, device name, device location, city, artist name, song name, amount of time, timer number, or the like). Each grammar model 1276 includes the names of entities (i.e., nouns) commonly found in speech about the particular domain (i.e., generic terms), whereas the lexical information 1286 from the gazetteer 1284 is personalized to the user(s) and/or the device. For instance, a grammar model associated with the shopping domain may include a database of words commonly used when people discuss shopping.

The intents identified by the IC component 1264 are linked to domain-specific grammar frameworks (included in 1276) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1276) framework or frameworks may correspond to sentence structures such as "purchase item called 'Item A' from Marketplace A."

For example, the NER component 1262 may parse the query to identify words as subject, object, verb, preposition, etc., based on grammar rules and/or models, prior to recognizing named entities. The identified verb may be used by the IC component 1264 to identify intent, which is then used by the NER component 1262 to identify frameworks. A framework for the intent of "play a song," meanwhile, may specify a list of slots/fields applicable to play the identified "song" and any object modifier (e.g., specifying a music collection from which the song should be accessed) or the like. The NER component 1262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1262 may search the database of generic words associated with the domain (in the knowledge base 1272). So, for instance, if the query was "identify this song," after failing to determine which song is currently being output, the NER component 1262 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 1250. The destination speechlet 1250 may be determined based on the NLU output. For example, if the NLU output includes a command to send a message, the destination speechlet 1250 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 1250 may provide some or all of this information to a text-to-speech (TTS) engine. The TTS engine may then generate an actual audio file for outputting the audio data determined by the application (e.g., "okay," or "we've undone the last action").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 142 during runtime operations where NLU operations are performed on text (such as text output from an ASR component 140). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1263. Each recognizer may include various NLU components such as an NER component 1262, IC component 1264 and other components such as an entity resolver, or other components.

For example, a messaging domain recognizer 1263-A (Domain A) may have an NER component 1262-A that identifies what slots (i.e., portions of input text) may correspond to particular words relevant to that domain. The words may correspond to entities such as (for the messaging domain) a recipient. An NER component 1262 may use a machine learning model, such as a domain specific conditional random field (CRF) to both identify the portions corresponding to an entity as well as identify what type of entity corresponds to the text portion. The messaging domain recognizer 1263-A may also have its own intent classification (IC) component 1264-A that determines the intent of the text assuming that the text is within the proscribed domain. An IC component may use a model, such as a domain specific maximum entropy classifier to identify the intent of the text, where the intent is the action the user desires the system to perform. For this purpose, device 102(*a*)-(*d*) may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 104, as illustrated herein are exemplary, and may be located in a stand-alone device or may be included, in whole or in part, as a component of a larger device or system, may be distributed across a network or multiple devices connected by a network, etc.

Figure 13:
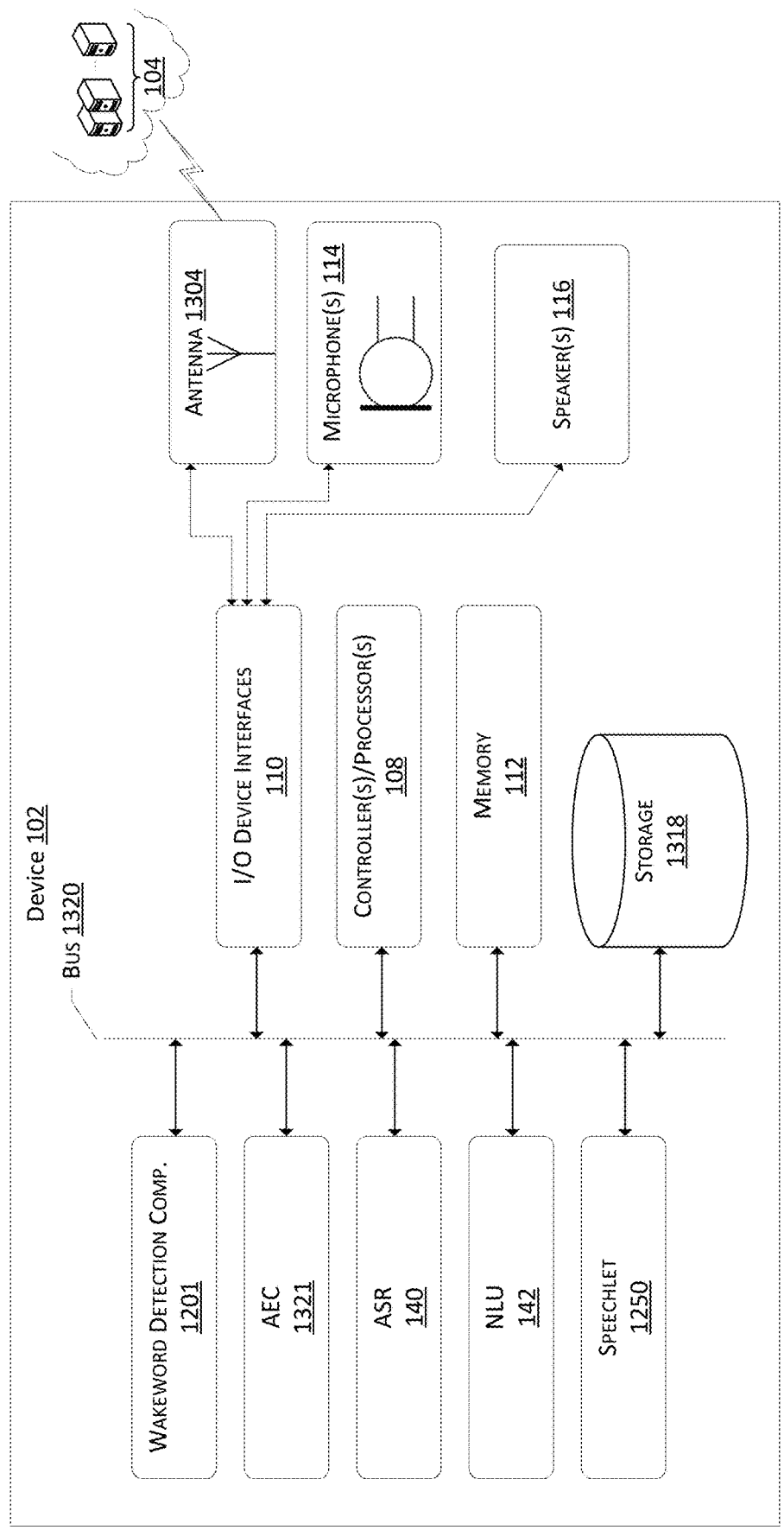
FIG. 13 illustrates a conceptual diagram of components of an example device that may utilized in association with device state reversion.

FIG. 13 illustrates a conceptual diagram of components of an example connected device from which sensor data may be received for device functionality control utilizing activity prediction. For example, the device may include one or more electronic devices such as voice interface devices (e.g., smart speaker devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. The device 102 may be implemented as a standalone device that is relatively simple in terms of functional capabilities with limited input/output components, memory, and processing capabilities. For instance, the device 102 may not have a keyboard, keypad, touchscreen, or other form of mechanical input. In some instances, the device 102 may include a microphone 114, a power source, and functionality for sending generated audio data via one or more antennas 1304 to another device and/or system.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include input devices such as a keyboard, a mouse, a touchscreen, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 114, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 13 may include one or more controllers/processors 108, that may include a central processing unit (CPU) for processing data and computer-readable instructions, and memory 112 for storing data and instructions of the device 102. In examples, the skills and/or applications described herein may be stored in association with the memory 112, which may be queried for content and/or responses as described herein. The device 102 may also be connected to removable or external non-volatile memory and/or storage, such as a removable memory card, memory key drive, networked storage, etc., through input/output device interfaces 110.

Computer instructions for operating the device 102 and its various components may be executed by the device's controller(s)/processor(s) 108, using the memory 112 as "working" storage at runtime. A device's computer instructions may be stored in a non-transitory manner in non-volatile memory 112, storage 1318, or an external device(s). Alternatively, some or all of the executable instructions may be embedded in hardware or firmware on the device 102 in addition to or instead of software.

The device 102 may include input/output device interfaces 110. A variety of components may be connected through the input/output device interfaces 110. Additionally, the device 102 may include an address/data bus 1320 for conveying data among components of the respective device. Each component within a device 102 may also be directly connected to other components in addition to, or instead of, being connected to other components across the bus 1320.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 108 may comprise graphics processors for driving animation and video output on the associated display. As a way of indicating to a user that a connection between another device has been opened, the device 102 may be configured with one or more visual indicators, such as the light element(s), which may be in the form of LED(s) or similar components (not illustrated), that may change color, flash, or otherwise provide visible light output, such as for a notification indicator on the device 102. The input/output device interfaces 110 that connect to a variety of components. This wired or wireless audio and/or video port may allow for input/output of audio/video to/from the device 102. The device 102 may also include an audio capture component. The audio capture component may be, for example, a microphone 114 or array of microphones, a wired headset or a wireless headset, etc. The microphone 114 may be configured to capture audio. If an array of microphones is included, approximate distance to a sound's point of origin may be determined using acoustic localization based on time and amplitude differences between sounds captured by different microphones of the array. The device 102 (using microphone 114, wakeword detection component 1301, ASR component 140, etc.) may be configured to generate audio data corresponding to captured audio. The device 102 (using input/output device interfaces 110, antenna 1304, etc.) may also be configured to transmit the audio data to the remote system 104 for further processing or to process the data using internal components such as a wakeword detection component 1201.

Via the antenna(s) 1304, the input/output device interface 110 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s), the system may be distributed across a networked environment. Accordingly, the device 102 and/or the remote system 104 may include an ASR component 140. The ASR component 140 of device 102 may be of limited or extended capabilities. The ASR component 140 may include language models stored in ASR model storage component, and an ASR component 140 that performs automatic speech recognition. If limited speech recognition is included, the ASR component 140 may be configured to identify a limited number of words, such as keywords detected by the device, whereas extended speech recognition may be configured to recognize a much larger range of words.

The device 102 and/or the system 104 may include a limited or extended NLU component 142. The NLU component 142 of device 102 may be of limited or extended capabilities. The NLU component 142 may comprise a name entity recognition module, an intent classification module and/or other components. The NLU component 142 may also include a stored knowledge base and/or entity library, or those storages may be separately located.

In examples, AEC may also be performed by the device 102. In these examples, the operations may include causing the AEC component 1321 to be enabled or otherwise turned on, or the operations may include causing the AEC component 1321 to transition from a first mode to a second mode representing a higher sensitivity to audio data generated by the microphone 114. The AEC component 1321 may utilize the audio data generated by the microphone 114 to determine if an audio fingerprint of the audio data, or portion thereof, corresponds to a reference audio fingerprint associated with the predefined event.

The device 102 and/or the system 104 may also include a speechlet 1250 that is configured to execute commands/functions associated with a spoken command as described herein. The device 102 may include a wakeword detection component 1201, which may be a separate component or may be included in an ASR component 140. The wakeword detection component 1201 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

Figure 14:
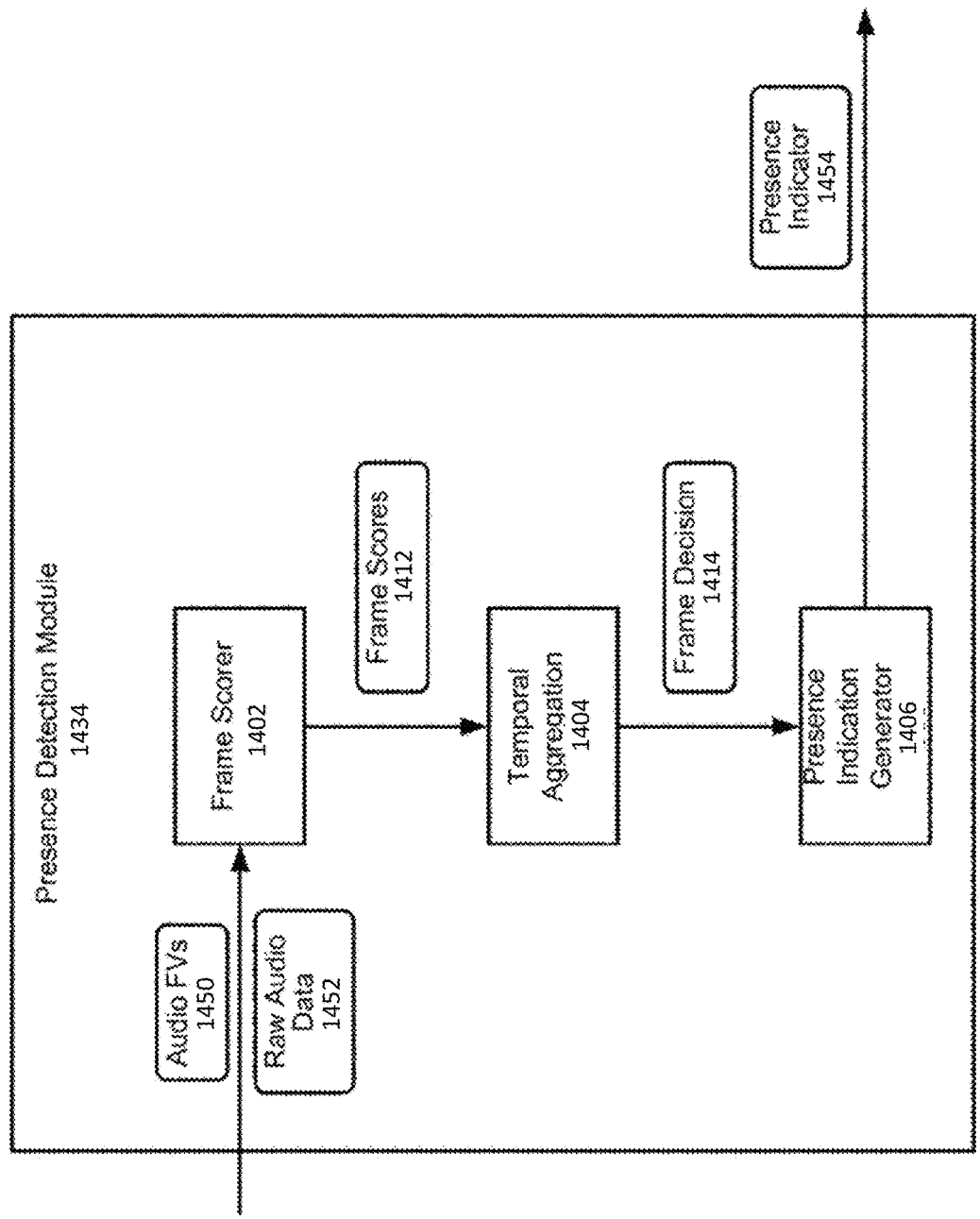
FIG. 14 illustrates a conceptual diagram of example presence detection utilized for device state reversion.

FIG. 14 illustrates processing of data related to presence detection by a device according to embodiments of the present disclosure. In particular, a presence detection module 1434 may use one or more models to analyze audio data to determine if a user is present and/or an activity being performed by a user. As shown in FIG. 14, the presence detection module 1434 may include a number of components to process and analyze the audio data. Audio data, such as feature vectors 1450, and/or raw audio data 1452 may be input into a frame scorer 1402 which may operate a trained model using machine learning techniques (such as a DNN sound classifier) to score particular audio data as likely corresponding to human presence or not. For example, the frame scorer 1402 may process a feature vector 1450 representing a frame's worth of audio data and create a score 1412 representing a probability that the frame corresponds to user presence and/or a probability that the frame corresponds to a user performing a particular activity. The score 1412 may be a binary indicator (for example, 0 for no human/activity detected, 1 for human/activity detected) or may be a different value indicating a probability or likelihood of human/activity presence. The scores may be passed to a temporal aggregation machine learning techniques to determine whether an incoming frame level score is sufficient to decide whether the frame should be classified as human/activity detected YES or human/activity detected NO, represented by frame decision 1414. In making a decision for a particular frame, the temporal aggregation component 1404 may consider the score 1412 from the individual frame as well as potentially scores from other frames (e.g., a certain number of frames coming before or after) as well as reference frame-level scores to align the output of the temporal aggregation component 1404.

The temporal aggregation component 1404 may operate an HMM to alternate states between human/activity detected YES and human/activity detected NO. One example of such operation is a state machine approach. State S=0 may correspond to no human/activity presence detected while state S=1 corresponds to human/activity presence detected. The probability of staying at state 0 is indicated as $P_{0\ to\ 0}$. The device will stay at state 0 (for example when going from frame t to frame t+1) as represented by $S_{t+1}=P_t*(1-a)+f_t*a$ where $f_t$ is the frame level score 1412 for frame t, a is a configurable attack rate (e.g., a factor representing how quickly the system should transition from no presence detected to presence detected), and $P_t$ represents a weighted sum/cumulated version of $f_t$. $P_t$ may be set to an initial value (e.g., 1) and then may decay based on the formula for $P_{t+1}$ shown below. The device will stay at state 0 if $P_t*(1-a)+f_t*a<T_{0to1}$ where $T_{0to1}$ represents a configurable score threshold for transitioning from state 0 to state 1. Otherwise, the device will transition from state 0 to state 1 (e.g., $P_{t+1}=1$, shown as $P_{0\ to\ 1}$) if $P_t*(1-a)+f_t*a\ T_{0to1}$.

The device may stay at state 1 (shown as $P_{1\ to\ 1}$) as represented by $P_{t+1}=P_t*r\ f_t*(1-r)$ where r is a configurable release rate (e.g., a factor representing how quickly the system should transition from presence detected to no presence detected). The device will stay at state 1 if $P_t*r+f_t*(1-r)>T_{1to0}$ where $T_{1to0}$ represents a configurable score threshold for transitioning from state 1 to state 0. Otherwise the device will transition from state 1 to state 0 (e.g., $P_{t+1}=0$, shown as $P_{1\ to\ 0}$) if $P_t*r+f_t*(1-r)\leq T_{1to0}$. Thresholds $T_{0to1}$ and $T_{1to0}$ and may be different, or may be the same.

While the decision 1414 is described as a frame decision, a decision may be made on groups of frames rather than (or in addition to) individual frames. Certain frames may be grouped and analyzed to decide whether the frames correspond to human presence being detected. Further, a classifier may be used to determine a presence decision for a frame or group of frames.

The temporal aggregation component 1404 may apply certain smoothing to avoid rapid changes in the frame decision 1414 (e.g., rapid state transitions). Such smoothing may account for natural pauses or breaks in audio that may not necessarily indicate a change in whether a human is present. For example, if the system detects washing dishes, then detects a momentary silence, then detects washing dishes again, the frames during the silence may correspond to scores 1412 corresponding to no presence detected even if the human who was washing is still in the vicinity of the device. To account for such audio fluctuations the temporal aggregation component 1404 may wait to change a state (e.g., a frame decision 1414) until a certain minimum number of frames are seen that have scores on the same side of the threshold. This minimum may be configured and may be different depending on which side of which threshold the frames appear.

As shown in FIG. 14, frame decisions 1414 may be passed to a presence indication generator 1406. The presence indication generator 1406 generates a periodic presence indicator 1454 which indicates the presence status at a particular point in time. The presence indication generator 1406 may generate a presence indicator 1454 according to a periodic schedule, for example every 5 seconds, 10 seconds, or the like. The presence indicator 1454 may be a representation of the frame decision taken at a particular moment in time. For example, if at time t, the frame decision is 1, the presence indicator 1454 corresponding to time t will be 1. Similarly, if at time t+30 seconds the frame decision is 1, the presence indicator 1454 for time t+30 will be 1, even if the frame decision for frames t+1 through t+29 were all 0. Alternatively, the presence indicator 1454 may be an average binary representation of the majority of frame decisions taken over a period of time. In the above example, the frame decision at t may be 1, but then if the frame decision for frames t+1 through t+29 were all 0, the frame decision for time t+30 will also be 0, even if the frame decision for time t+30 is 1. The presence indicator may also be calculated in other manners.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
receiving first data indicating a trigger event has occurred for a state change of a first device;
storing, in a database, second data indicating a first operational state of the first device prior to the state change;
sending a first command to the first device, the first command configured to cause the first device to transition from the first operational state to a second operational state that differs from the first operational state;
storing historical device state data indicating prior operational states of the first device, the prior operational states indicating the first device being in the first operational state and the first device being in the second operational state;
receiving, after the first command is sent, audio data representing a user utterance;
determining from natural language understanding processing that an intent of the user utterance is to cause a target device to revert to a previous state;
in response to the user utterance requesting to cause the target device to revert to the previous state:
querying the database for the second data;
determining third data indicating a current state of devices associated with account data, the account data associated with the first device; and
determining, from the account data, that the first device is in the first operational state during a period of time of a day that corresponds to when the audio data was received;
determining that the first device corresponds to the target device from:
the second data; the third data; and
the first device being in the first operational state during the period of time of the day that corresponds to when the audio data was received; and
sending a second command to the first device, the second command configured to cause the first device to transition from the second operational state to the first operational state.

2. The system of claim 1, the operations further comprising:
determining that the trigger event corresponds to a routine that causes device state changes when the trigger event is detected;
determining a subset of the devices that are associated with the routine, the subset of the devices including the first device; and
wherein determining the first operational state of the first device is in response to the first device being included in the subset of the devices.

3. The system of claim 1, the operations further comprising:
determining that user presence is detected in an environment where the first device is situated;
determining, from the account data indicating which of the devices are associated with the environment, that a subset of the devices is associated with the environment, wherein the subset of the devices includes the first device; and
wherein determining that the first device corresponds to the target device is in response to the first device being included in the subset of the devices.

4. A method, comprising:
receiving first data indicating a trigger event has occurred for a state change of a first device;
determining second data indicating a first state of the first device prior to the state change;
storing historical device state data indicating prior operational states of the first device, the prior operational states indicating the first device being in a first operational state and the first device being in a second operational state;
receiving first user input data requesting to cause a target device to revert to a previous state;
based at least in part on the first user input data, determining third data indicating a current state of devices associated with account data, the devices including the first device, the third data indicating the first device is in a second state;
determining that the first device corresponds to the target device based at least in part on:
the second data; the third data; and
the first device being in the first state during a period of time of a day that corresponds to when the first data was received; and
sending a command to the first device, the command configured to cause the first device to transition from the second state to the first state.

5. The method of claim 4, further comprising:
determining that the trigger event corresponds to a routine that causes device state changes when the trigger event is detected;
determining a subset of the devices associated with the routine, the subset of the devices including the first device; and
wherein determining the first state of the first device comprises determining the first state of the first device based at least in part on the first device being included in the subset of the devices.

6. The method of claim 4, further comprising:
determining that user presence is detected in an environment where the first device is situated;
determining, based at least in part on the user presence being detected in the environment, a subset of the devices that are associated with the environment, wherein the subset of the devices includes the first device; and
wherein determining that the first device corresponds to the target device comprises determining that the first device corresponds to the target device based at least in part on the first device being included in the subset of the devices.

7. The method of claim 4, further comprising:
determining that a second device transitioned from a third state to a fourth state in response to the trigger event;
determining that the first device is associated with the second device; and based at least in part on the first user input data and the second device being associated with the first device, causing the second device to revert back to the third state.

8. The method of claim 4, further comprising:
determining a first confidence value associated with determining that the first device corresponds to the target device;
determining that the first confidence value fails to satisfy a threshold confidence value for sending the command;
based at least in part on the first confidence value failing to satisfy the threshold confidence value, causing output of a request to confirm that the first device corresponds to the target device;
receiving second user input data responsive to the request; and
wherein sending the command comprises sending the command based at least in part on the second user input data.

9. The method of claim 4, further comprising:
storing fourth data indicating the transition from the second state to the first state was in response to the first user input data;
determining, from fifth data, that prior reversions of the first device from the second state to the first state were in response to prior user input data; and
based at least in part on the fourth data and the fifth data, generating sixth data representing a recommendation to alter when the first device is transitioned from the first state to the second state.

10. The method of claim 4, further comprising:
storing fourth data indicating that a transition of the first device from the second state to the first state was based at least in part on the first user input data;
receiving second user input data indicating a request to revert a device state; and determining, based at least in part on the fourth data and the second user input data, that the request to revert the device state is associated with transitioning the first device from the first state to the second state.

11. A system, comprising:
one or more processors; and
non-transitory computer-readable media storing computer-executable instructions that, when executed by the one or more processors, cause the one or more processors to perform operations comprising:
receiving first data indicating a trigger event has occurred for a state change of a first device;
determining second data indicating a first state of the first device prior to the state change;
storing historical device state data indicating prior operational states of the first device, the prior operational states indicating of the first device being in a first operational state and of the first device being in a second operational state;
receiving first user input data requesting to cause a target device to revert to a previous state;
based at least in part on the first user input data, determining third data indicating a current state of devices associated with account data, the devices including the first device, the third data indicating the first device is in a second state;
determining that the first device corresponds to the target device based at least in part on:
the second data;
the third data; and
the first device being in the first state during a period of time of a day that corresponds to when the first data was received; and
sending a command to the first device, the command configured to cause the first device to transition from the second state to the first state.

12. The system of claim 11, the operations further comprising:
determining that the trigger event corresponds to a routine that causes device state changes when the trigger event is detected;
determining a subset of the devices that are associated with the routine, the subset of the devices including the first device; and
wherein determining the first state of the first device comprises determining the first state of the first device based at least in part on the first device being included in the subset of the devices.

13. The system of claim 11, the operations further comprising:
determining that user presence is detected in an environment where the first device is situated;
determining, based at least in part on the user presence being detected in the environment, a subset of the devices that are associated with the environment, wherein the subset of the devices includes the first device; and
wherein determining that the first device corresponds to the target device comprises determining that the first device corresponds to the target device based at least in part on the first device being included in the subset of the devices.

14. The system of claim 11, the operations further comprising:
determining that a second device transitioned from a third state to a fourth state in response to the trigger event;
determining that the first device is associated with the second device; and based at least in part on the first user input data and the second device being associated with the first device, causing the second device to revert back to the third state.

15. The system of claim 11, the operations further comprising:
determining a first confidence value associated with determining that the first device corresponds to the target device;
determining that the first confidence value fails to satisfy a threshold confidence value for sending the command;
based at least in part on the first confidence value failing to satisfy the threshold confidence value, causing output of a request to confirm that the first device corresponds to the target device;
receiving second user input data confirming the request; and
wherein sending the command comprises sending the command based at least in part on the second user input data.

16. The system of claim 11, the operations further comprising:
storing fourth data indicating the transition from the second state to the first state was in response to the first user input data;

determining, from fifth data, that prior reversions of the first device from the second state to the first state were in response to prior user input data; and based at least in part on the fourth data and the fifth data, generating sixth data representing a recommendation to alter when the first device is transitioned from the first state to the second state.

17. The system of claim 11, the operations further comprising:

storing fourth data indicating that a transition of the first device from the second state to the first state was based at least in part on the first user input data;

receiving second user input data indicating a request to revert a device state; and determining, based at least in part on the fourth data and the second user input data, that the request to revert the device state is associated with transitioning the first device from the first state to the second state.

18. The method of claim 4, further comprising:

determining device usage data indicating occurrences of a voice interface device causing transitions of the prior operational states; and wherein determining that the first device corresponds to the target device based at least in part on the device usage data.

19. The method of claim 4, further comprising:

determining, from sensor data associated with the first device, a brightness level associated with an environment in which the first device is disposed; and wherein determining that the first device corresponds to the target device based at least in part on the brightness level.

20. The method of claim 4, further comprising:

determining prior user input data indicating a user reaction to prior target device determinations; and wherein determining that the first device corresponds to the target device based at least in part on the user reaction to the prior target device determinations.

\* \* \* \* \*